United States Patent
Ghatare

(10) Patent No.: US 7,340,447 B2
(45) Date of Patent: Mar. 4, 2008

(54) PARTITIONING DATA ACCESS REQUESTS

(75) Inventor: Sanjay P. Ghatare, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 10/682,330

(22) Filed: Oct. 9, 2003

(65) Prior Publication Data

US 2005/0080766 A1   Apr. 14, 2005

(51) Int. Cl.
*G06F 17/30* (2006.01)

(52) U.S. Cl. .................. 707/3; 707/1; 707/4; 707/5; 707/104.1

(58) Field of Classification Search ............. 707/1, 707/3, 4, 5, 104.1
See application file for complete search history.

(56) References Cited

U.S. PATENT DOCUMENTS

| | | | |
|---|---|---|---|
| 5,077,666 A | 12/1991 | Brimm et al. | 705/2 |
| 5,301,320 A | 4/1994 | McAtee et al. | |
| 5,455,953 A | 10/1995 | Russell | 710/266 |
| 5,467,471 A | 11/1995 | Bader | |
| 5,530,861 A | 6/1996 | Diamant et al. | 705/8 |
| 5,581,691 A | 12/1996 | Hsu et al. | 714/15 |
| 5,659,616 A | 8/1997 | Sudia | |
| 5,664,154 A | 9/1997 | Purcell et al. | |
| 5,678,041 A | 10/1997 | Baker et al. | 707/9 |
| 5,692,125 A | 11/1997 | Schloss et al. | 705/9 |
| 5,708,780 A | 1/1998 | Levergood et al. | 709/229 |
| 5,721,900 A | 2/1998 | Banning et al. | |
| 5,724,595 A | 3/1998 | Gentner | |
| 5,732,408 A | 3/1998 | Takahashi | |
| 5,734,837 A | 3/1998 | Flores et al. | |
| 5,745,574 A | 4/1998 | Muftic | |
| 5,764,890 A | 6/1998 | Glasser et al. | 726/11 |
| 5,796,841 A | 8/1998 | Cordery et al. | |
| 5,815,703 A | 9/1998 | Copeland et al. | |
| 5,822,454 A | 10/1998 | Rangarajan | |
| 5,831,975 A | 11/1998 | Chen et al. | |
| 5,848,273 A | 12/1998 | Fontana et al. | |

(Continued)

FOREIGN PATENT DOCUMENTS

WO   WO 02/07396 A1   1/2002

OTHER PUBLICATIONS

Leon, McAfee's NetTools Promises to Ease Network Desktop Diagnosis, InfoWorld, San Mateo, Jul. 24, 1995, vol. 17, Iss. 30, p. 53.

(Continued)

*Primary Examiner*—Christian Chace
*Assistant Examiner*—Farhan M. Syed
(74) *Attorney, Agent, or Firm*—Townsend and Townsend and Crew LLP

(57) ABSTRACT

A system with multiple data stores receives a data access request that includes one or more variables. The system determines which data store can service the data access request by using mappings of the variables to the data stores in order to evaluate whether partition expressions for the data stores overlap with the variables in the data access request. The data access request is then sent to the data stores corresponding to the partition expressions that overlap. The partition expressions can have one or more variables. The present invention supports multi-dimensional partitioning.

21 Claims, 17 Drawing Sheets

U.S. PATENT DOCUMENTS

| | | |
|---|---|---|
| 5,867,665 A | 2/1999 | Butman et al. |
| 5,867,824 A | 2/1999 | Saito et al. |
| 5,875,461 A | 2/1999 | Lindholm |
| 5,884,284 A | 3/1999 | Peters et al. |
| 5,901,287 A | 5/1999 | Bull et al. |
| 5,903,882 A | 5/1999 | Asay et al. |
| 5,907,837 A | 5/1999 | Ferrel et al. |
| 5,944,824 A | 8/1999 | He ............................ 713/201 |
| 5,960,422 A | 9/1999 | Prasad |
| 5,961,593 A | 10/1999 | Gabber et al. |
| 5,966,702 A | 10/1999 | Fresko et al. |
| 5,987,457 A | 11/1999 | Ballard |
| 5,987,471 A | 11/1999 | Bodine et al. |
| 5,991,768 A | 11/1999 | Sun et al. |
| 5,991,807 A | 11/1999 | Schmidt et al. |
| 5,991,810 A | 11/1999 | Shapiro et al. ............. 709/229 |
| 5,999,911 A | 12/1999 | Berg et al. ..................... 705/9 |
| 6,012,098 A | 1/2000 | Bayeh et al. |
| 6,041,306 A | 3/2000 | Du et al. |
| 6,044,462 A | 3/2000 | Zubeldia et al. |
| 6,061,726 A | 5/2000 | Cook et al. |
| 6,061,740 A | 5/2000 | Ferguson et al. |
| 6,073,109 A | 6/2000 | Flores et al. ................... 705/8 |
| 6,073,242 A | 6/2000 | Hardy et al. |
| 6,078,747 A | 6/2000 | Jewitt |
| 6,085,188 A * | 7/2000 | Bachmann et al. ............ 707/3 |
| 6,098,056 A | 8/2000 | Rusnak et al. ................ 705/75 |
| 6,104,705 A | 8/2000 | Ismail et al. |
| 6,105,006 A | 8/2000 | Davis et al. |
| 6,105,063 A | 8/2000 | Hayes, Jr. |
| 6,105,066 A | 8/2000 | Hayes, Jr. |
| 6,112,181 A | 8/2000 | Shear et al. |
| 6,131,120 A | 10/2000 | Reid ........................... 709/225 |
| 6,134,634 A | 10/2000 | Marshall, Jr. et al. |
| 6,138,104 A | 10/2000 | Marchak et al. ................ 705/9 |
| 6,141,778 A | 10/2000 | Kane et al. ..................... 726/4 |
| 6,145,003 A | 11/2000 | Sanu et al. |
| 6,151,531 A | 11/2000 | Frankel et al. ................ 700/90 |
| 6,154,776 A | 11/2000 | Martin |
| 6,158,010 A | 12/2000 | Moriconi et al. ............... 726/1 |
| 6,173,311 B1 | 1/2001 | Hassett et al. |
| 6,182,142 B1 | 1/2001 | Win et al. .................... 709/229 |
| 6,195,689 B1 | 2/2001 | Bahlmann |
| 6,195,696 B1 | 2/2001 | Baber et al. |
| 6,195,710 B1 | 2/2001 | Borgendale et al. |
| 6,208,986 B1 | 3/2001 | Schneck et al. ................ 707/3 |
| 6,212,558 B1 | 4/2001 | Antur et al. ................. 709/221 |
| 6,216,199 B1 | 4/2001 | DeKoning et al. |
| 6,216,231 B1 | 4/2001 | Stubblebine |
| 6,219,667 B1 | 4/2001 | Lu et al. |
| 6,223,291 B1 | 4/2001 | Puhl et al. |
| 6,253,239 B1 | 6/2001 | Shklar et al. |
| 6,253,257 B1 | 6/2001 | Dundon |
| 6,256,739 B1 | 7/2001 | Skopp et al. ................... 726/2 |
| 6,260,077 B1 | 7/2001 | Rangarajan et al. |
| 6,263,332 B1 | 7/2001 | Nasr et al. |
| 6,263,363 B1 | 7/2001 | Rosenblatt et al. |
| 6,266,420 B1 | 7/2001 | Langford et al. ........... 719/329 |
| 6,275,916 B1 | 8/2001 | Weldon, Jr. et al. |
| 6,278,993 B1 | 8/2001 | Kumar et al. |
| 6,279,043 B1 | 8/2001 | Hayward et al. |
| 6,292,833 B1 | 9/2001 | Liao et al. |
| 6,295,061 B1 | 9/2001 | Park et al. |
| 6,304,949 B1 | 10/2001 | Houlsdworth |
| 6,314,470 B1 | 11/2001 | Ward et al. |
| 6,317,783 B1 | 11/2001 | Freishtat et al. |
| 6,323,881 B1 | 11/2001 | Broulik |
| 6,330,569 B1 | 12/2001 | Baisley et al. |
| 6,336,124 B1 | 1/2002 | Alam et al. |
| 6,336,214 B1 | 1/2002 | Sundaresan |
| 6,338,097 B1 | 1/2002 | Krenzke et al. ................ 707/9 |
| 6,339,826 B2 | 1/2002 | Hayes, Jr. et al. |
| 6,341,289 B1 * | 1/2002 | Burroughs et al. ...... 707/104.1 |
| 6,347,312 B1 | 2/2002 | Byrne et al. .................... 707/3 |
| 6,349,306 B1 | 2/2002 | Malik et al. |
| 6,353,929 B1 | 3/2002 | Houston |
| 6,356,892 B1 | 3/2002 | Corn et al. |
| 6,356,996 B1 | 3/2002 | Adams |
| 6,366,913 B1 | 4/2002 | Fitler, Jr. et al. ................ 705/3 |
| 6,367,013 B1 | 4/2002 | Bisbee et al. |
| 6,389,589 B1 | 5/2002 | Mishra et al. |
| 6,397,232 B1 | 5/2002 | Cheng-Hung et al. |
| 6,401,101 B1 | 6/2002 | Britton et al. |
| 6,401,138 B1 | 6/2002 | Judge et al. |
| 6,408,336 B1 | 6/2002 | Schneider et al. |
| 6,415,368 B1 | 7/2002 | Glance et al. |
| 6,434,531 B1 | 8/2002 | Lancelot et al. ......... 707/104.1 |
| 6,438,690 B1 | 8/2002 | Patel et al. |
| 6,442,567 B1 | 8/2002 | Retallick et al. ................ 707/6 |
| 6,457,066 B1 | 9/2002 | Mein et al. |
| 6,487,600 B1 | 11/2002 | Lynch |
| 6,490,655 B1 | 12/2002 | Kershaw |
| 6,493,702 B1 | 12/2002 | Adar et al. |
| 6,493,731 B1 | 12/2002 | Jones et al. |
| 6,499,023 B1 | 12/2002 | Dong et al. |
| 6,507,857 B1 | 1/2003 | Yalcinalp |
| 6,519,571 B1 | 2/2003 | Guheen et al. |
| 6,519,767 B1 | 2/2003 | Carter et al. |
| 6,523,022 B1 | 2/2003 | Hobbs |
| 6,523,027 B1 | 2/2003 | Underwood |
| 6,529,941 B2 | 3/2003 | Haley et al. |
| 6,539,021 B1 | 3/2003 | Kennelly et al. |
| 6,539,379 B1 | 3/2003 | Vora et al. ..................... 707/6 |
| 6,540,142 B1 | 4/2003 | Alleshouse |
| 6,542,515 B1 | 4/2003 | Kumar et al. |
| 6,549,941 B1 | 4/2003 | Jaquith et al. |
| 6,564,370 B1 | 5/2003 | Hunt |
| 6,571,216 B1 | 5/2003 | Garg et al. |
| 6,571,279 B1 | 5/2003 | Herz et al. |
| 6,574,675 B1 | 6/2003 | Swenson |
| 6,587,856 B1 | 7/2003 | Srinivasan et al. |
| 6,591,260 B1 | 7/2003 | Schwarzhoff et al. |
| 6,606,644 B1 | 8/2003 | Ford et al. |
| 6,609,198 B1 | 8/2003 | Wood et al. |
| 6,611,840 B1 | 8/2003 | Baer et al. |
| 6,632,251 B1 | 10/2003 | Rutten et al. |
| 6,643,661 B2 | 11/2003 | Polizzi et al. |
| 6,655,593 B2 | 12/2003 | Alleshouse |
| 6,671,695 B2 | 12/2003 | McFadden |
| 6,671,745 B1 | 12/2003 | Mathur et al. |
| 6,675,261 B2 | 1/2004 | Shandony |
| 6,678,733 B1 | 1/2004 | Brown et al. |
| 6,701,368 B1 | 3/2004 | Chennapragada et al. |
| 6,704,807 B1 | 3/2004 | Mathur et al. |
| 6,704,873 B1 | 3/2004 | Underwood |
| 6,708,170 B1 | 3/2004 | Byrne et al. |
| 6,721,804 B1 | 4/2004 | Rubin et al. |
| 6,728,685 B1 | 4/2004 | Ahluwalia |
| 6,732,178 B1 | 5/2004 | Van Horne et al. |
| 6,741,853 B1 | 5/2004 | Jiang et al. |
| 6,745,327 B1 | 6/2004 | Messing |
| 6,748,374 B1 | 6/2004 | Madan et al. |
| 6,748,569 B1 | 6/2004 | Brooke et al. |
| 6,751,797 B1 | 6/2004 | Desgranges et al. |
| 6,754,702 B1 | 6/2004 | Kennelly et al. |
| 6,760,750 B1 | 7/2004 | Boneh et al. |
| 6,768,988 B2 | 7/2004 | Boreham et al. |
| 6,775,782 B1 | 8/2004 | Buros et al. |
| 6,782,379 B2 | 8/2004 | Lee |
| 6,785,686 B2 | 8/2004 | Boreham et al. |
| 6,785,726 B1 | 8/2004 | Freeman et al. |
| 6,791,949 B1 | 9/2004 | Ryu et al. |
| 6,816,871 B2 | 11/2004 | Lee |
| 6,839,701 B1 | 1/2005 | Baer et al. |

| | | |
|---|---|---|
| 6,842,863 B1 | 1/2005 | Fox et al. |
| 6,851,054 B2 | 2/2005 | Wheeler et al. |
| 6,854,016 B1 | 2/2005 | Kraenzel et al. |
| 6,880,086 B2 | 4/2005 | Kidder et al. |
| 6,886,170 B1 | 4/2005 | Bahrs et al. |
| 6,901,588 B1 | 5/2005 | Krapf et al. |
| 6,959,415 B1 | 10/2005 | Soderberg et al. |
| 6,968,503 B1 | 11/2005 | Chang et al. |
| 6,970,862 B2 | 11/2005 | Kwan |
| 6,999,959 B1* | 2/2006 | Lawrence et al. ............. 707/5 |
| 7,013,469 B2 | 3/2006 | Smith et al. |
| 7,035,926 B1 | 4/2006 | Cohen et al. |
| 7,039,871 B2 | 5/2006 | Cronk |
| 7,069,330 B1 | 6/2006 | McArdle et al. |
| 7,114,037 B2 | 9/2006 | Agarwal et al. |
| 2001/0002485 A1 | 5/2001 | Bisbee et al. |
| 2001/0007133 A1 | 7/2001 | Moriconi et al. |
| 2001/0023440 A1 | 9/2001 | Franklin et al. |
| 2001/0027439 A1 | 10/2001 | Holtzman et al. |
| 2001/0049770 A1 | 12/2001 | Cai et al. |
| 2002/0032684 A1 | 3/2002 | Kobayahi et al. ........... 709/223 |
| 2002/0038306 A1 | 3/2002 | Griffin et al. |
| 2002/0049749 A1 | 4/2002 | Helgeson et al. |
| 2002/0062435 A1 | 5/2002 | Nemirovsky et al. |
| 2002/0065701 A1 | 5/2002 | Kim et al. |
| 2002/0078032 A1 | 6/2002 | Shi et al. |
| 2002/0078307 A1 | 6/2002 | Zahir |
| 2002/0083178 A1 | 6/2002 | Brothers |
| 2002/0091836 A1 | 7/2002 | Moetteli |
| 2002/0099822 A1 | 7/2002 | Rubin et al. |
| 2002/0103785 A1 | 8/2002 | Harvey |
| 2002/0103819 A1 | 8/2002 | Duvillier et al. |
| 2002/0107828 A1 | 8/2002 | Harvey |
| 2002/0108003 A1 | 8/2002 | Ellis et al. |
| 2002/0129024 A1 | 9/2002 | Lee |
| 2002/0129135 A1 | 9/2002 | Delany et al. |
| 2002/0129177 A1 | 9/2002 | McGuire et al. |
| 2002/0133516 A1 | 9/2002 | Davis et al. |
| 2002/0138543 A1 | 9/2002 | Teng et al. |
| 2002/0138572 A1 | 9/2002 | Delany et al. |
| 2002/0138577 A1 | 9/2002 | Teng et al. |
| 2002/0138763 A1 | 9/2002 | Delany et al. |
| 2002/0143865 A1 | 10/2002 | Tung Loo et al. |
| 2002/0143943 A1 | 10/2002 | Lee et al. |
| 2002/0147746 A1 | 10/2002 | Lee |
| 2002/0147801 A1 | 10/2002 | Gullotta et al. |
| 2002/0147813 A1 | 10/2002 | Teng et al. |
| 2002/0152244 A1 | 10/2002 | Dean et al. |
| 2002/0152254 A1 | 10/2002 | Teng |
| 2002/0156879 A1 | 10/2002 | Delany et al. |
| 2002/0166049 A1 | 11/2002 | Sinn |
| 2002/0169767 A1 | 11/2002 | Harvey |
| 2002/0174238 A1 | 11/2002 | Sinn et al. |
| 2002/0184444 A1 | 12/2002 | Shandony |
| 2003/0014442 A1* | 1/2003 | Shiigi et al. ................ 707/513 |
| 2003/0028752 A1 | 2/2003 | Fu et al. |
| 2003/0037052 A1 | 2/2003 | Kitain et al. |
| 2003/0055806 A1 | 3/2003 | Wong et al. |
| 2003/0065921 A1 | 4/2003 | Chang |
| 2003/0083908 A1 | 5/2003 | Steinmann |
| 2003/0088708 A1 | 5/2003 | Lewallen |
| 2003/0105654 A1 | 6/2003 | Macleod et al. |
| 2003/0105733 A1 | 6/2003 | Boreham et al. |
| 2003/0105742 A1 | 6/2003 | Boreham et al. |
| 2003/0110376 A1 | 6/2003 | Wiener et al. |
| 2003/0115196 A1 | 6/2003 | Boreham et al. |
| 2003/0115548 A1 | 6/2003 | Melgar |
| 2003/0120593 A1 | 6/2003 | Bansal et al. |
| 2003/0120601 A1 | 6/2003 | Ouye et al. |
| 2003/0144982 A1 | 7/2003 | Reulein et al. |
| 2003/0145074 A1 | 7/2003 | Penick ....................... 707/100 |
| 2003/0204481 A1 | 10/2003 | Lau |
| 2003/0217101 A1 | 11/2003 | Sinn |
| 2003/0217127 A1 | 11/2003 | Sinn |
| 2003/0217333 A1 | 11/2003 | Smith et al. |
| 2004/0002903 A1 | 1/2004 | Stolfo et al. |
| 2004/0010514 A1 | 1/2004 | Agarwal et al. |
| 2004/0010519 A1 | 1/2004 | Sinn et al. |
| 2004/0010520 A1 | 1/2004 | Tsang et al. |
| 2004/0010591 A1 | 1/2004 | Sinn et al. |
| 2004/0010606 A1 | 1/2004 | Delaney et al. |
| 2004/0010607 A1 | 1/2004 | Lee et al. |
| 2004/0010665 A1 | 1/2004 | Agarwal et al. |
| 2004/0010791 A1 | 1/2004 | Jain et al. |
| 2004/0024762 A1 | 2/2004 | Agarwal et al. |
| 2004/0049675 A1 | 3/2004 | Micali et al. |
| 2004/0064356 A1 | 4/2004 | Saito et al. |
| 2004/0153509 A1 | 8/2004 | Alcom et al. |

OTHER PUBLICATIONS

Cooney, IBM rolls out host- and server-based mgmt. apps, Network World, Framingham, Feb. 6, 1995, vol. 12, Iss. 6, pp. 6-7.

Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.

Musthaler, The trouble with help desk selection, Network World, Framingham, Feb. 20, 1995, vol. 12, Iss. 8, pp. 35-39.

Clear Trust, Unified Access Management, Securant Technologies, Inc., pp. 1-23, 1997.

SiteMinder Agent Operations, Version 4.0, Netegrity Inc., 1997.

SiteMinder Deployment Guide, Version 4.0, Netegrity Inc., 1997.

SiteMinder Policy Server Operations Guide, Version 4.0, Netegrity Inc., 1997.

SiteMinder Developer's API Guide, Version 4.0, Netegrity Inc., 1997.

SiteMinder Installation Guide, Version 4.0, Netegrity Inc., 1997.

Shi, et al., "An enterprise directory solution with DB2," IBM Systems Journal, vol. 39, No. 2, 2000.

SiteMinder Policy Server Operations Guide, Version 4.5, Netegrity Inc., 2000.

Chen, "The Entity-Relationship Model-Toward a Unified View of Data," ACM Transactions on Database Systems, vol. 1, No. 1, Mar. 1976, pp. 9-36.

Lim, et al., "Query Optimization and Processing in Federated Database Systems," Association for Computing Machinery, 1993, pp. 720-722.

Wyss, et al., "A Relational Algebra for Data/Metadata Integration in a Federated Database System," CIKM, Nov. 5-10, 2001, pp. 65-72.

Merz, et al., "DIRECT: A Query Facility for Multiple Databases," ACM Transactions on Information Systems, vol. 12, No. 4, Oct. 1994, pp. 339-359.

Braumandl, et al., "Evaluating Functional Joins Along Nested Reference Sets in Object-Relational and Object-Oriented Databases," Proceedings of the 24th VLDB Conference, 1998, pp. 110-121.

Lakshimanan, et al., "SchemaSQL-An Extension to SQL for Multidatabase Interoperability," ACM Transactions on Database Systems, vol. 26, No. 4, Dec. 2001, pp. 476-519.

Laird, "Comment on 'An Optimal Evaluation of Boolean Expressions in an Online Query System'," Communications of the ACM, vol. 22, No. 10, Oct. 1979, pp. 549-550.

McHugh, et al., "Integrating Dynamically-Fetched External Information into a DBMS for Semistructured Data," Department of Computer Science, Stanford University.

Sheth, et al., "Federated Database Systems," ACM Computing Surveys, vol. 22, No. 3, Sep. 1990, pp. 201-236.

Bentley, et al., "Data Structures for Range Searching," Computing Surveys, vol. 11, No. 4, Dec. 1979, pp. 397-409.

Stonebraker, et al., "On Rules, Procedures, Caching and Views in Data Base Systems," EECS Dept., University of California, Berkeley, pp. 1-18.

Pirahesh, et al., "Extensible/Rule Based Query Rewrite Optimization in Starburst," Association for Computing Machinery, 1992, pp. 39-48.

Batory, et al., "Reeingineering a Complex Application Using a Scalable Data Structure Compiler," Association of Computing Machinery, Dec. 1994, pp. 111-120.

Hakimpour, et al., "Resolving Semantic Heterogeneity in Schema Integration: an Ontology Based Approach," ACM, Oct. 17-19, 2001, pp. 297-308.

Hsu, et al., "Reformulating Query Plans for Multidatabase Systems," ACM, 1993, pp. 423-432.

Kaluskar, et al., "Rules Evaluation in Oracle9i," Oracle Corporation, 10 pages.

Howes, Timothy A. et al., "Understanding And Deploying LDAP Directory Services," Netscape Communications Corporation, pp. 2 cover pages, 102-105, 277-292 and 699-723, 1999.

Myers, M. et al., "X.509 Internet Pulic Key Infrastructure Online Certificate Status Protocol—OCSP," The Internet Society, 22 pages, Jun. 1999.

U.S. Appl. No. 09/997,408, Office Action dated Sep. 7, 2005, 11 pages.

U.S. Appl. No. 09/997,408, Final Office Action dated Feb. 15, 2006, 7 pages.

U.S. Appl. No. 09/997,409, Office Action dated Jun. 3, 2005, 17 pages.

U.S. Appl. No. 09/997,409, Office Action dated Nov. 7, 2005, 12 pages.

U.S. Appl. No. 09/998,893, Office Action dated Jun. 13, 2005, 20 pages.

U.S. Appl. No. 09/998,893, Final Office Action dated Dec. 28, 2005, 12 pages.

U.S. Appl. No. 09/998,895, Office Action dated Mar. 25, 2005, 18 pages.

U.S. Appl. No. 09/998,895, Final Office Action dated Aug. 1, 2005, 19 pages.

U.S. Appl. No. 09/998,895, Advisory Action dated Oct. 20, 2005, 3 pages.

U.S. Appl. No. 09/998,895, Office Action dated Feb. 7, 2006, 13 pages.

U.S. Appl. No. 09/998,898, Office Action dated Sep. 21, 2005, 13 pages.

U.S. Appl. No. 09/998,908, Office Action dated Jan. 25, 2005, 24 pages.

U.S. Appl. No. 09/998,908, Final Office Action dated Aug. 22, 2005, 14 pages.

U.S. Appl. No. 09/998,908, Advisory Action dated Nov. 1, 2005, 3 pages.

U.S. Appl. No. 09/998,908, Office Action dated Feb. 16, 2006, 15 pages.

U.S. Appl. No. 09/998,910, Office Action dated Jan. 28, 2005, 12 pages.

U.S. Appl. No. 09/998,910, Office Action dated Dec. 13, 2005, 10 pages.

U.S. Appl. No. 09/998,914, Office Action dated Jul. 14, 2005, 19 pages.

U.S. Appl. No. 09/998,914, Final Office Action dated Jan. 30, 2006, 15 pages.

U.S. Appl. No. 09/998,916, Office Action dated Mar. 21, 2005, 16 pages.

U.S. Appl. No. 09/998,916, Final Office Action dated Sep. 8, 2005, 12 pages.

U.S. Appl. No. 09/998,916, Advisory Action dated Dec. 9, 2005, 4 pages.

U.S. Appl. No. 09/998,926, Office Action dated Aug. 25, 2005, 26 pages.

U.S. Appl. No. 09/998,926, Final Office Action dated Feb. 27, 2006, 15 pages.

U.S. Appl. No. 09/999,074, Office Action dated Mar. 24, 2005, 24 pages.

U.S. Appl. No. 09/999,074, Final Office Action dated Sep. 20, 2005, 19 pages.

U.S. Appl. No. 09/999,074, Advisory Action dated Dec. 20, 2005, 3 pages.

U.S. Appl. No. 09/999,177, Office Action dated Mar. 25, 2005, 23 pages.

U.S. Appl. No. 09/999,177, Final Office Action dated Sep. 14, 2005, 26 pages.

U.S. Appl. No. 09/999,177, Advisory Action dated Dec. 14, 2005, 6 pages.

U.S. Appl. No. 10/145,684, Office Action dated Jun. 16, 2005, 17 pages.

U.S. Appl. No. 10/145,684, Final Office Action dated Dec. 1, 2005, 10 pages.

U.S. Appl. No. 10/145,684, Advisory Action dated Mar. 9, 2006, 3 pages.

U.S. Appl. No. 10/146,150, Office Action dated Jul. 27, 2005, 17 pages.

U.S. Appl. No. 10/146,150, Final Office Action dated Dec. 20, 2005, 12 pages.

U.S. Appl. No. 10/146,150, Advisory Action dated Mar. 13, 2006, 4 pages.

U.S. Appl. No. 10/314,888, Office Action dated Jan. 26, 2006, 31 pages.

Camenisch, Jan et al., "Privacy and Identity Management for Everyone", ACM, 2005, 8 pages.

Kim, K.H., "APIs for Real-Time Diistributed Object Programming", Coputer, IEEE 2000, Jun., pp. 72-80.

McLellan, et al., "Building More Usable APIs", IEEE Software, pp. 78-86, May/Jun. 1998.

Microsoft, "Microsoft's Vision for an Identity Metasystem", Microsoft Corporation, http://www.identityblog.com/stories/2005/07/05/IdentityMetasystem.htm, printed date Oct. 6, 2006, 9 pages.

PC PRO, "Identity Systems", http://research.pcpro.co.uk/detail/ORG/1139341311_744.html, printed date Oct. 6, 2006, 2 pages.

Prasad, CK, "Distributing Sun Java System Identity Server Applications Using Java Web Start", Article Index, Apr. 2004, 8 pages.

Saba—Products, Saba Enterprise 5, dated 1997-2006, 2 pages.

Saba—Company, dated 1997-2006, 1 page.

Saba—Solutions, Competency-Driven HCM, dated 1997-2006, 1 page.

Saba—Talent, dated 1997-2006, 2 pages.

Saba—Collaboration, dated 1997-2006, 1 page.

Stets, et al., "Component-Based APIs for Versioning and Distributed Applications", IEEE, pp. 54-61, 1999.

U.S. Appl. No. 09/570,276, Office Action dated Nov. 14, 2006, 28 pages.

U.S. Appl. No. 09/997,409, Office Action dated May 3, 2006, 9 pages.

U.S. Appl. No. 09/997,409, Office Action dated Oct. 20, 2006, 9 pages.

U.S. Appl. No. 09/998,893, Office Action dated Jul. 17, 2006, 17 pages.

U.S. Appl. No. 09/998,893, Final Office Action dated Jan. 4, 2007, 12 pages.

U.S. Appl. No. 09/998,895, Final Office Action dated Jul. 20, 2006, 22 pages.

U.S. Appl. No. 09/998,895, Final Office Action dated Jan. 18, 2007, 17 pages.

U.S. Appl. No. 09/998,898, Office Action dated Mar. 28, 2006, 7 pages.

U.S. Appl. No. 09/998,898, Advisory Office Action dated Dec. 29, 2006, 3 pages.

U.S. Appl. No. 09/998,898, Office Action dated Mar. 7, 2007, 10 pages.

U.S. Appl. No. 09/998,908, Final Office Action dated Aug. 22, 2006, 25 pages.

U.S. Appl. No. 09/998,910, Final Office Action dated Feb. 14, 2007, 15 pages.

U.S. Appl. No. 09/998,914, Final Office Action dated Feb. 16, 2007, 13 pages.

U.S. Appl. No. 09/998,916, Advisory Action dated Apr. 5, 2006, 11 pages.

U.S. Appl. No. 09/998,916, Office Action dated Sep. 5, 2006, 20 pages.

U.S. Appl. No. 09/998,916, Office Action dated Feb. 23, 2007 12 pages.

U.S. Appl. No. 09/998,926, Office Action dated Sep. 11, 2006, 19 pages.

U.S. Appl. No. 09/998,926, Office Action dated Feb. 26, 2007, 16 pages.
U.S. Appl. No. 10/145,684, Office Action dated Jun. 30, 2006, 25 pages.
U.S. Appl. No. 10/146,150, Office Action dated May 30, 2006, 18 pages.
U.S. Appl. No. 10/146,150, Advisory Office Action dated Dec. 5, 2006, 13 pages.
U.S. Appl. No. 10/314,888, Office Action dated Jul. 26, 2006, 26 pages.
U.S. Appl. No. 10/314,888, Office Action dated Feb. 9, 2007, 34 pages.
U.S. Appl. No. 10/325,465, Office Action dated Sep. 19, 2006, 25 pages.
U.S. Appl. No. 10/327,607, Office Action dated Feb. 13, 2006, 5 pages.
U.S. Appl. No. 10/327,607, Office Action dated Apr. 18, 2006, 33 pages.
U.S. Appl. No. 10/328,920, Office Action dated May 31, 2006, 20 pages.
U.S. Appl. No. 10/345,873, Office Action dated Sep. 9, 2005, 13 pages.
U.S. Appl. No. 10/345,873, Office Action dated Mar. 10, 2006, 7 pages.
U.S. Appl. No. 10/345,879, Office Action dated Oct. 5, 2006, 30 pages.
U.S. Appl. No. 10/354,913, Office Action dated Sep. 9, 2004, 19 pages.
U.S. Appl. No. 10/354,913, Final Office Action dated Apr. 6, 2004, 22 pages.
U.S. Appl. No. 10/354,913, Office Action dated Apr. 15, 2005, 20 pages.
U.S. Appl. No. 10/354,913, Final Office Action dated Dec. 5, 2005, 15 pages.
U.S. Appl. No. 10/354,913, Office Action dated May 12, 2006, 16 pages.
U.S. Appl. No. 10/354,914, Office Action dated Aug. 1, 2005, 15 pages.
U.S. Appl. No. 10/354,914, Final Office Action dated Feb. 10, 2006, 16 pages.
Wahl, M., "Informed Control Enabling Identity Interoperability", http://www.Idap.com/1/commentary/wahl/20050203_01.shtml, Feb. 3, 2005, 3 pages.

* cited by examiner

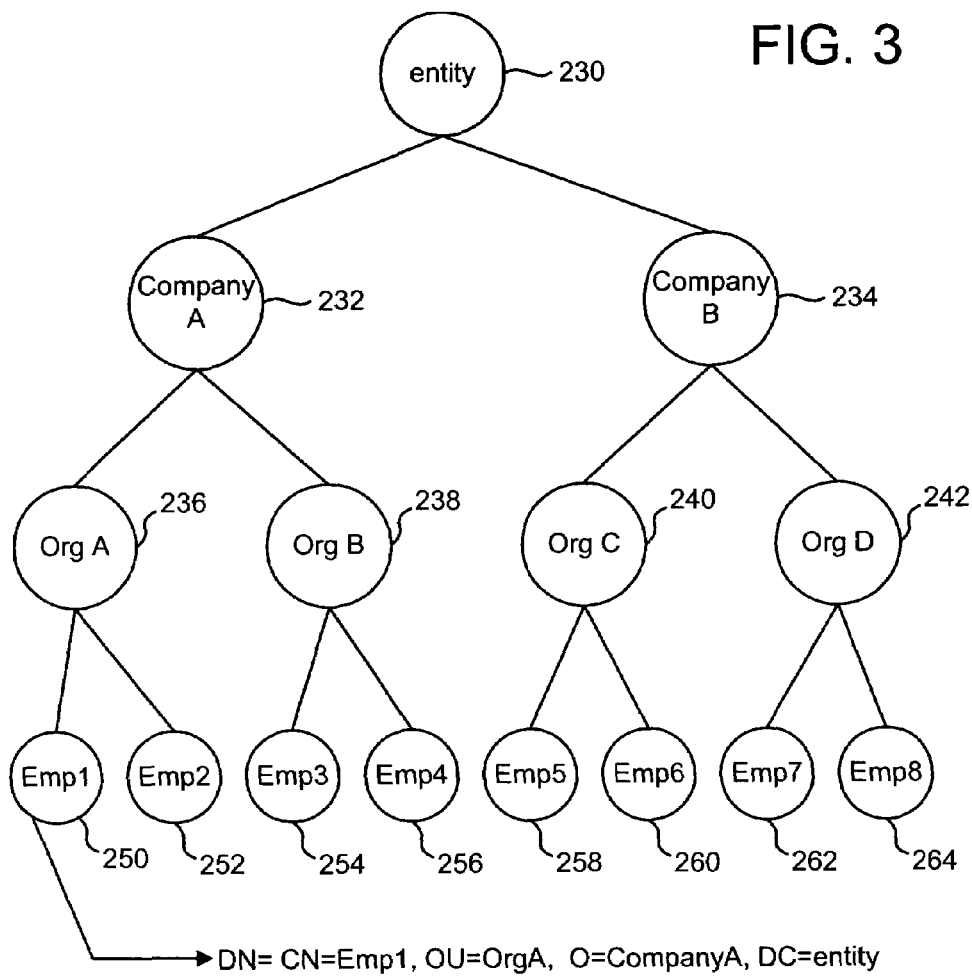
FIG. 3
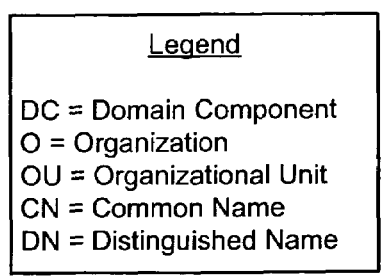

FIG. 20
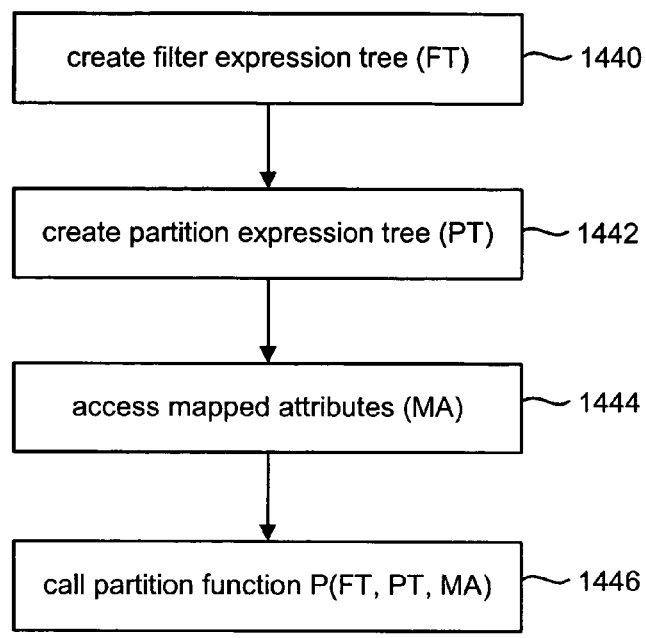
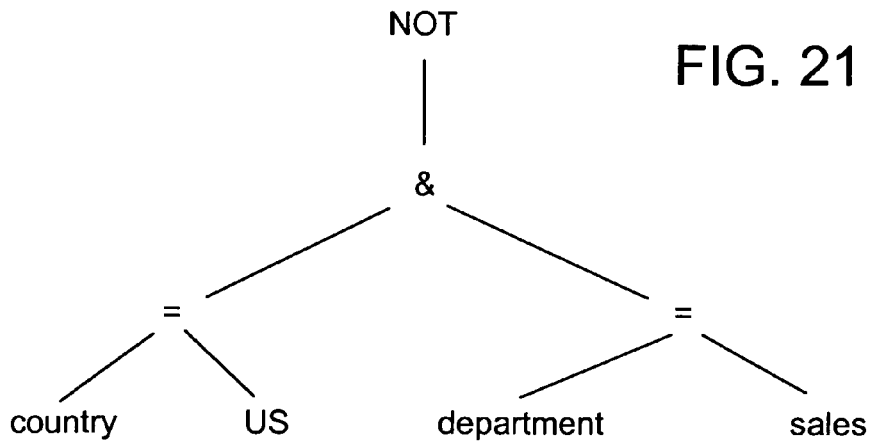
FIG. 21

PARTITIONING DATA ACCESS REQUESTS

CROSS-REFERENCE TO RELATED APPLICATIONS

This Application is related to the following U.S. patent applications: U.S. patent application Ser. No. 09/998,908, "Support for Multiple Data Stores," filed on Nov. 30, 2001; U.S. patent application Ser. No. 10/314,888, "Support for Multiple Mechanisms for Accessing Data Stores," filed on Dec. 9, 2002; "Support for RDBMS in an LDAP System", by Sanjay P. Ghatare, Ser. No. 10/682,575, filed the same day as the present application; and "Translating Data Access Requests," by Sanjay P. Ghatare, Ser. No. 10/682,252, filed the same day as the present application. The four above listed patent applications are incorporated herein by reference in their entirety.

BACKGROUND OF THE INVENTION

1. Field of the Invention

The present invention is directed to technology for partitioning data access requests.

2. Description of the Related Art

With the growth of the Internet, the use of networks and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization. Some users of Identity Systems also use Access Systems. An Access System provides for the authentication and authorization of users attempting to access resources. For efficiency purposes, there is an advantage to integrating the Identity System and the Access System. For example, both systems can share the same set of data stores.

Some Identity Systems use LDAP directories to store data. Other systems use relational databases or other types of data stores. Typically, all of the data is maintained in one data store. However, there are cases when multiple data stores are necessary. For example, if the amount of data is too big to fit in one data store, multiple data stores may be necessary. Additionally, some entities desire a back-up or shadow data store, which stores a replica of the main data store for fault tolerance reasons. Thus, there is a need to support multiple data stores.

Some systems are designed for a particular type of data store. For example, some Identity Systems are designed to work with LDAP directories. However, some organization that desire to use the Identity System may already have a relational database populated with data and in use for other systems. Thus, there is a desire for supporting the use of relational databases for systems designed to work with other types of data stores.

Some prior solutions have provided the use of relational databases by systems designed to work with other types of data stores. However, these prior solutions required that the relational database employ a specific predetermined schema. Requiring a specific predetermined schema may be acceptable for a new database that is not to be used with other applications. Existing databases, however, have already been implemented with a schema. Additionally, some databases may also need to interface with other applications that may not work with the specific predetermined schema. Thus, there is a need to support the use of relational databases for systems designed to work with other types of data stores, where the relational database is not required to be of a specific schema.

SUMMARY OF THE INVENTION

The present invention, roughly described, pertains to technology for partitioning data access requests. In one embodiment of the present invention, a system with multiple data stores receives a data access request that includes one or more variables in a logical object class format (or another format). The system determines which data store can service the data access request by using mappings of the variables to the data stores to evaluate whether partition expressions for said data stores overlap with the variables in the data access request. The data access request is then sent to the data stores corresponding to the partition expressions that overlap.

Some embodiments of the present invention include receiving a filter expression for a data access request. The system determines whether the filter expression overlaps with one or more partition expressions if the filter expression is a simple expression. The system determines whether child sub-filters of the filter expression overlap with the one or more partition expressions and combines results of the determination of whether child sub-filters overlap to determine whether the filter expression overlaps with the partition expressions, if the filter expression is a composite expression. The filter expression is provided to the one or more data sources associated with partition expressions that overlap with the filter expression.

Some example implementations include receiving a filter expression for a data access request and accessing a partition expressions for first data source of a set of data sources. The system performs a partition compare function using the filter expression and the partition expression to determine whether the filter expression overlaps with the partition expression, if the filter expression and the partition expression are both simple expressions. The system performs the partition compare function by treating the filter expression as an input partition expression and treating the partition expression as an input filter expression in order to determine whether the filter expression overlaps the partition expression, if the partition expression is a composite expression. The filter expression is provided to the first data source if the filter expression overlaps with the filter expression. In some cases the form of the filter expression is changes or terms are removed prior to providing it to the first data source.

In one embodiment, the present invention is implemented as part of an Identity System, or an integrated Identity and Access System. However, the present invention is not limited to Identity Systems and can be implemented as part of many other types of systems.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 3 is an example of a directory tree structure.

FIG. 20 is a flow chart describing one embodiment of a process for evaluating a partition expression against a filter expression.

FIG. 21 depicts an example of a partition expression tree

DETAILED DESCRIPTION

I. Access Management System

Figure 1:
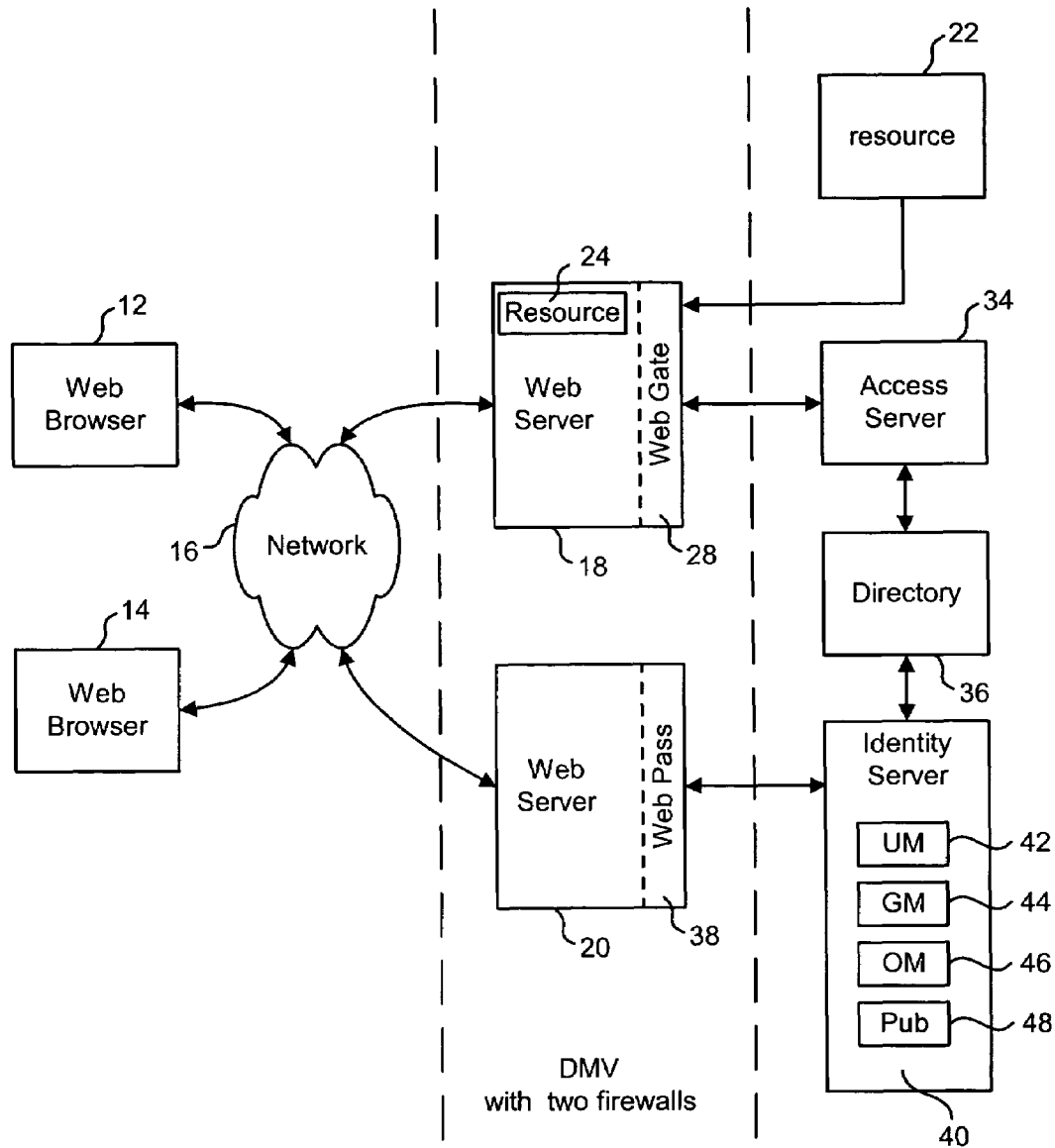
FIG. 1 is a block diagram depicting the components of one embodiment of the present invention.

The present invention can be used with an Identity System, an Access System, or an integrated Identity and Access System ("an Access Management System"). The present invention can also be used with other systems. FIG. 1 depicts an example of an Access Management System that provides identity management services and/or access management services for a network. The identity management portion of the system manages identity profiles, while the access management portion of the system provides security for resources across one or more Web Servers (or other components). Although the system of FIG. 1 includes an integrated Identity System and Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g., user, group, organization, thing, etc.). The data elements of the identity profile are called attributes. An attribute can be a characteristic, quality or element of information about something. In one embodiment, an attribute may include a name, a value and access criteria. Other embodiments may include more or less information. The Identity Server includes three main applications, which effectively handle the identity profiles and privileges of the user population: User Manager 42, Group Manager 44, and Organization Manager (also called Object Manager) 46. User Manager 42 manages the identity profiles for individual users. Group Manager 44 manages identity profiles for groups. Organization Manager 46 manages identity profiles for organizations and/or can manage any object. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations and/or other objects within an e-business network, including partners, suppliers, or even major internal organizations such as sales offices and business units. Certain infrastructure security and management operations are best handled at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, handheld devices, mobile telephones, etc. Typically, such computing devices will have one or more processors that are programmed by code that is stored in one or more processor readable storage devices. The one or more processors are in communication with the processor readable storage devices, peripherals (e.g., keyboards, monitors, pointing devices, printers, etc.) and communication interfaces (e.g., network interfaces, modems, wireless transmitters/receivers, etc.).

The system of FIG. 1 is scalable. There can be one or many Web Servers, one or many Access Servers, and one or many Identity Servers. In one embodiment, Directory 36 is a Directory Server and communicates with other servers/modules using LDAP or LDAP over SSL. In other embodiments, Directory 36 can implement other protocols or can be other types of data repositories (e.g., relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation regarding unprotected resources. First, an end user causes his or her browser to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
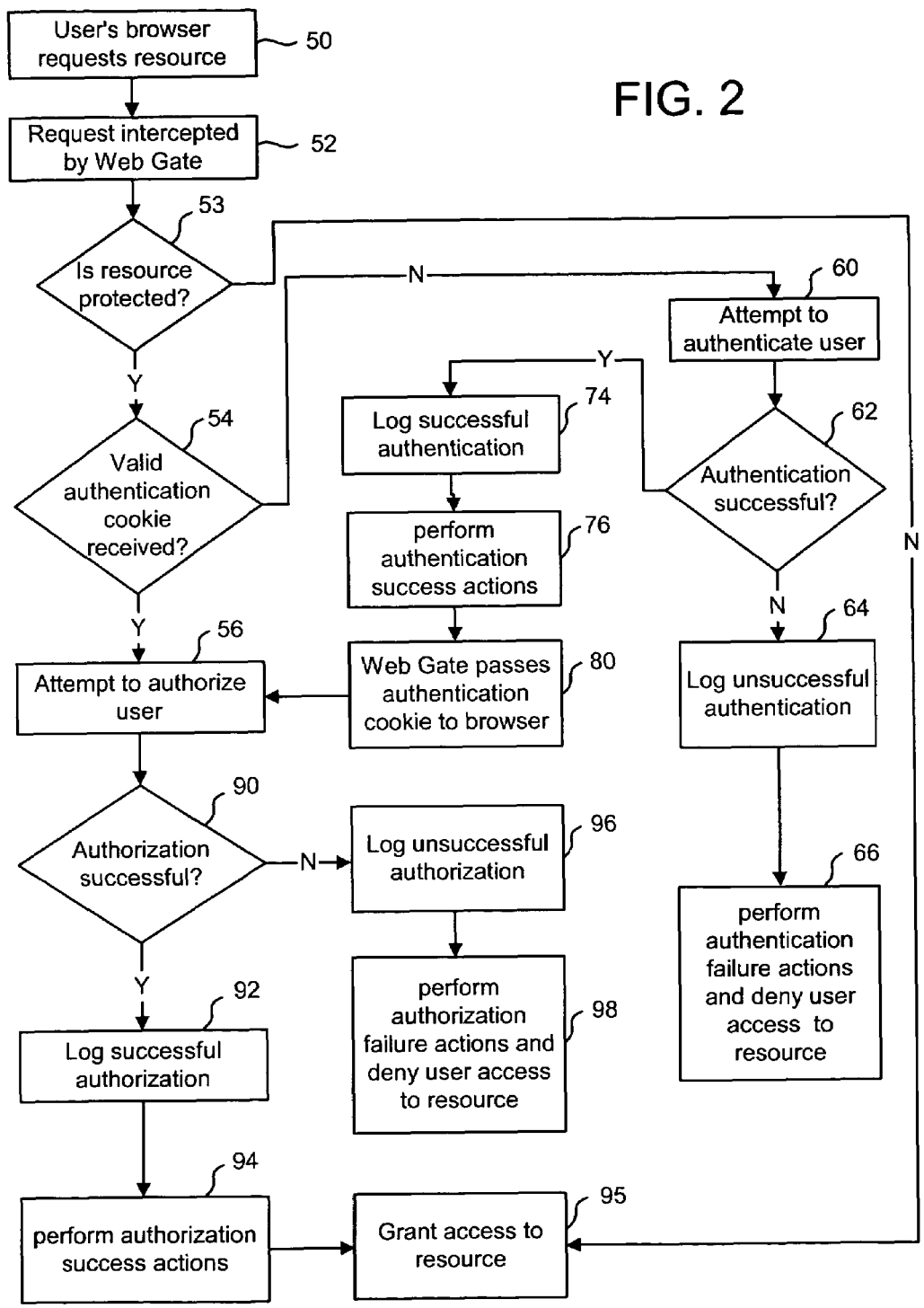
FIG. 2 is a flow chart describing one embodiment of a process for authenticating and authorizing.

FIG. 2 provides a flow chart for one embodiment of a method for authenticating and authorizing. In step 50, a user's browser 12 requests a web-enabled resource 22 or 24. The request is intercepted by Web Gate 28 in step 52. The method then determines whether the requested resource is protected by an authentication and/or authorization rule in step 53. If the resource is not protected, then access is granted to the requested resource in step 95. If the requested resource is protected, however, the method proceeds to step 54. If the user has previously authenticated for a protected resource in the same domain, a valid authentication cookie is passed by browser 12 with the request in step 50. The authentication cookie is intercepted by Web Gate in step 52. If a valid cookie is received (step 54), the method attempts to authorize the user in step 56. If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged in step 64. After step 64, the system then performs authentication failure actions and Web Gate 28 denies the user access to the requested resource in step 66. In step 74, the successful authentication of the user for the resource is logged. The method then performs authentication success actions in step 76. In response to the successful authentication, Web Gate 28 then passes a valid authentication cookie to browser 12 (step 80), which stores the cookie. After passing the cookie in step 80, the system attempts to authorize in step 56.

In step 56, the method determines whether the user is authorized to access the requested resource. If the user is authorized (step 90), the method proceeds to step 92. Otherwise, the unsuccessful authorization is logged in step 96. After step 96, the method performs authorization failure actions (step 98) and Web Gate 28 denies the user access to the requested resource. If authorization is successful (step 90), then the successful authorization of the user is logged in step 92. Authorization success actions are performed in step 94. The user is granted access to the requested resource in step 95. In one embodiment of step 95, some or all of HTTP request information is provided to the resource. In one or more scenarios, the resource being accessed is the Identity System. Other scenarios include accessing other resources.

More information about authorization, authentication, an Access System and an Identity System can be found in U.S. patent application Ser. No. 09/998,908, "Support for Multiple Data Stores," filed on Nov. 30, 2001, which is incorporated herein by reference in its entirety.

Both the Identity System and the Access System make use of Directory 36. A unit of information stored in Directory 36 is called an entry or identity profile, which is a collection of information about an object. The information in an entry often describes a real-world object such as a person, but this is not required. A typical directory includes many entries that correspond to people, departments, groups and other objects in the organization served by the directory. An entry is composed of a set of attributes, each of which describes one particular trait, characteristic, quality or element of the object. In one embodiment, each attribute has a type, one or more values, and associated access criteria. The type describes the kind of information contained in the attribute, and the value contains the actual data.

An entry in the directory may have a set of attributes that are required and a set of attributes that are allowed. For example, an entry describing a person may be required to have a cn (common name) attribute and a sn (surname) attribute. One example of an allowed attribute may be a nickname. In one embodiment, any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, region, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

In one embodiment, each identity profile is based on a logical object class definition. Each logical object class may include single and multi-valued attributes. The attributes can be mandatory or optional. Each attribute can also have a data type and a semantic type. A semantic type is a behavior associated with an attribute. For example, the semantic type of a telephone number is to dial the telephone number.

Figure 5:
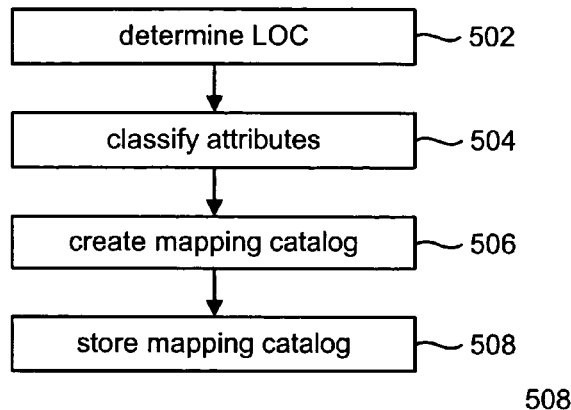
FIG. 5 is a flow chart describing one embodiment of a process for creating a mapping catalog.

FIG. 3 depicts an example directory tree that can be stored in Directory 36. Each node on the tree is an entry in the directory structure that includes an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 230. Each of the companies with Extranet access would have a node at a level below node 230. For example, company A (node 232) and company B (node 234) are directly below node 230. Each company may be broken up into organizations. The organizations could be departments in the company or logical groups to help manage the users. For example, FIG. 3 shows company A broken up into two organizations: organization A with node 236 and organization B with node 238. Company B is shown to be broken up into two organizations: organization C with node 240 and organization D with node 242. FIG. 5 shows organization A having two end users: employee 1 with node 250 and employee 2 with node 252. Organization B is shown with two end users: employee 3 with node 254 and employee 4 with node 256. Organization C is shown with two end users: employee 5 with node 258 and employee 6 with node 260. Organization D is shown with two end users: employee 7 with node 262 and employee 8 with node 264.

Each entity has a distinguished name (DN), which uniquely identifies the node. In one embodiment, each entry also has a relative name, which is different from all other relevant names on the same level of the hierarchy. In one implementation, the distinguished name (DN) comprises a union of the relative names up the tree. For example, the distinguished name of employee 1 (node 250) is DN=CN=Empl, OU=OrgA, O=CompanyA, DC=entity, where:
DC=Domain Component
O=Organization
OU=Organizational Unit
CN=common name.

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

II. Supporting Multiple Data Stores

The above description of the Identity and Access Systems assumes that the data store is a LDAP directory. In other embodiments, other types of data stores can be used. For example, a relational database can also be used. In one embodiment, the Identity and/or Access Systems can be used with both a LDAP directory and a relational database. In one implementation, the Identity and Access Systems will internally treat all data as LDAP type data and convert data to the appropriate formats upon access to the various data stores. In another embodiment, the Identity and Access Systems will use a logical object class format for data and upon accessing a data store, the data will be translated between the formats in the data store and the logical object class. The logical object class format is a predetermined format for storing data. One embodiment of a logical object class format has a one-to-one correspondence with an LDAP data type; therefore, the logical object class is the same as the LDAP format. In other embodiments, the logical object class format will differ slightly from the LDAP data type. In yet other embodiments, the logical object class can differ significantly from the LDAP data type. There are many different formats for a logical object class that can be used with the present invention. No particular format is required.

Table 1 provides a mapping of compatible data types for LDAP and RDBMS (Relational Database Management System).

TABLE 1

Compatible data types for LDAP and RDBMS.

| LDAP data types | Compatible RDBMS data type |
|---|---|
| Case exact match string (ces) | Char, varchar |
| Case insensitive string (cis) | Char, varchar |
| Telephone (tel) | Char, varchar (spaces and hyphens ignored in comparison) |
| Integer (int) | Integer, number, numeric |
| Distinguished Name (dn) | Char, varchar |
| Binary (bin) | Blob |

Note that some of the data types (e.g., CIS, telephone) require special comparison functions. The support for CIS can be easily executed in RDBMS server using either UPPER( ) or LOWER( ) function. Support for telephone number requires existence of comparison functions in the database server that ignores spaces and hyphens. Since each function may not exist in the RDBMS, it may need to be implemented as a user defined function. Case insensitive search or telephone number search results in a sequential search of data in a RDBMS server, unless the functional index is built into the database.

The LDAP protocol operations include SEARCH, ADD, DELETE and MODIFY. Other operations can also be used. In one embodiment, a LDAP SEARCH operation maps to a SQL SELECT operation, a LDAP ADD operation maps to a SQL INSERT operation, a LDAP DELETE operation maps to a SQL DELETE operation, and a LDAP MODIFY operation maps to a SQL UPDATE operation.

The logical name space is a system of names used for defining logical object classes and their attributes. To add support for RDBMS, and other data sources, the logical object class will be mapped to columns of tables in the relational database, object classes in the LDAP data store, or other structures in other types of data stores.

Figure 4:
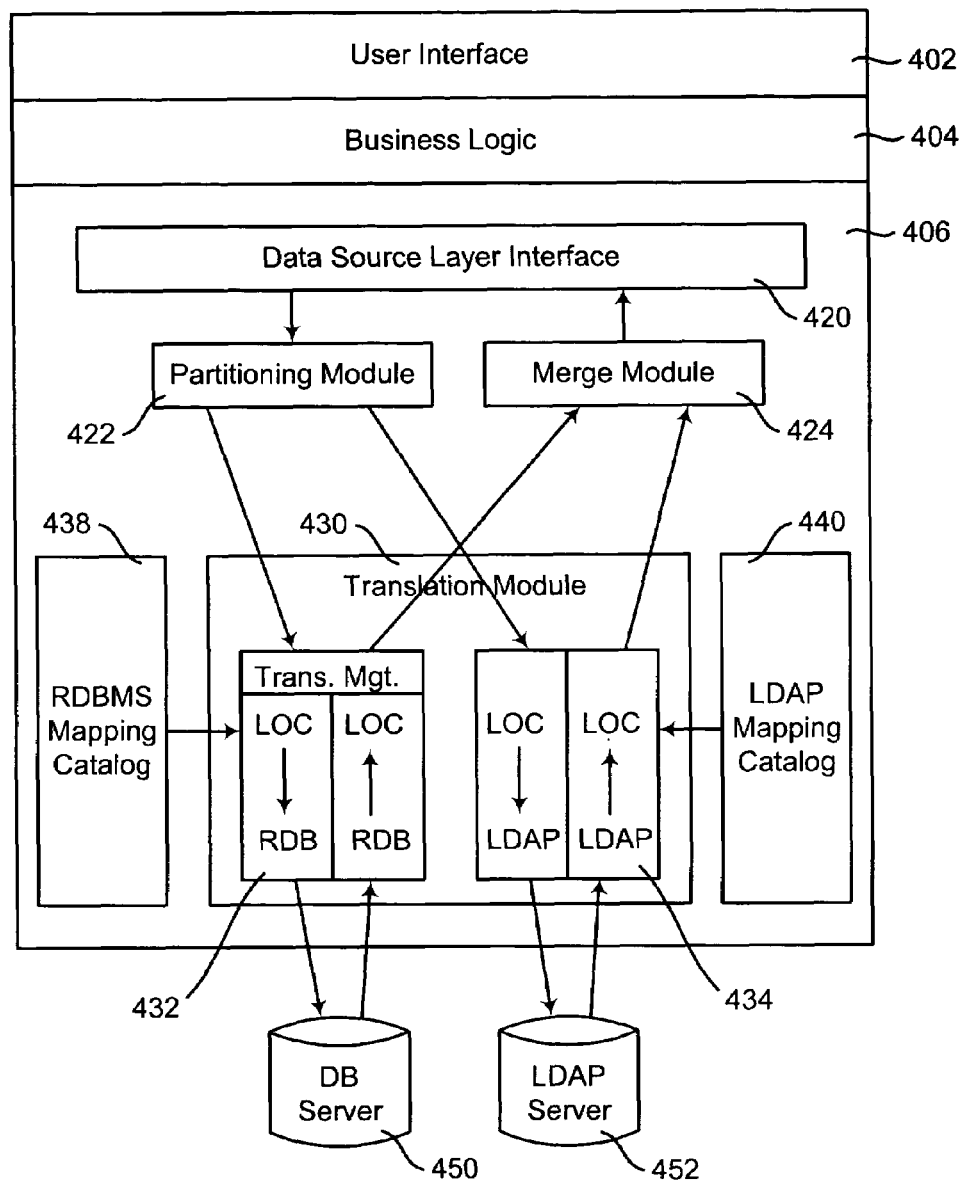
FIG. 4 is a block diagram of one embodiment of an architecture for supporting multiple data stores.

FIG. 4 depicts a high level architecture for supporting multiple types of data stores. FIG. 4 depicts User Interface layer 402, Business Logic layer 404, and Data Source layer 406. Business Logic layer 404 sits below User Interface layer 402 and above Data Source layer 406. User Interface layer 402 is used to interface with the user. Business Logic layer 404 performs the core logic of the Identity System and Access System described above. In other embodiments, Business Logic layer 404 can perform other types of business logic for other applications. Business Logic layer 404 is in communication with User Interface layer 402 and Data Source layer 406. When Business Logic layer 404 needs to access data (including reading data, writing data, modifying data, deleting data, etc.), Business Logic layer 404 will communicate with Data Source layer 406 for the data access. In one embodiment, regardless of the type of data store being accessed, Business Logic layer 404 will send data to Data Source layer 406 and receive data from Data Source layer 406 in the same format. In one embodiment, that format is the logical object class format.

Data Source layer 406 includes Data Source Layer Interface 420, Partitioning Module 422, Merge Module 424, and Transaction Module 430. Transaction Module 430 includes a first sub-module 432 for communicating with relational database server 450 and a second sub-module 434 for communicating with LDAP server 452. If the system were to include additional data stores, additional sub-modules would also be included. Data Source Layer Interface 420 is used to provide an interface for Business Logic layer 406. Upon receiving a data access request from Business Logic layer 406, Data Source Layer Interface 420 will provide the access request to Partitioning Module 422. Partitioning module 422 will determine which data store should receive the request. In some embodiments, the request can be broken into sub-requests and different sub-requests can be provided to different data stores. The data access request can be partitioned based on manually created partition rules for data or by other criteria. For example, in some systems, data will be partitioned by the day of the week the request was received. In other embodiments, other rules can be used. More information about partitioning is discussed below. Upon partitioning, the appropriate request will be sent to the appropriate one or more sub-modules (e.g., 432 or 434). If the data request is for relational database server 450, then the request is sent to sub-module 432. If the request is intended for LDAP server 452, then the request is sent to sub-module 434. A data access request can be for one data store or multiple data stores (including one, two or more relational databases). Sub-module 432 translates the request from an LDAP operation on logical object classes to one or more operations on RDBMS tables using the RDBMS Mapping Catalog 438. For example, an LDAP query is translated to a select statement. An LDAP modify can be translated to an insert, delete or update operation on a RDBMS system. Sub-module 434 translates operations on logical object classes to operations on LDAP record entries in LDAP server 452, based on LDAP Mapping Catalog 440.

Note that the data sources (e.g., 450 and 452) can be implemented on separate computing devices from user interface 402, business logic 404 and data source layer 606. Alternatively, the data sources (e.g., 450 and 452) can be implemented on the same computing devices as one or more of user interface 402, business logic 404 and data source layer 606.

LDAP filters support operators AND, OR, NOT, equal, approx, greater than, less than, present, sub-string and extensible. The extensible operator is not supported in RDBMS. The approx (sounds like) operator may not have the equivalent operator/function in all databases. In other embodiments, other operators can also be used.

Upon translating the data access request to the appropriate format for database server 450 or LDAP server 452, the translated request is then sent to the appropriate data store. After the operation is performed on the appropriate data store, one or more results are sent back to sub-module 432 or sub-module 434. Those results are then translated back to the logical object class format and provided to merge module 424. Merge module 424 will merge all the results for a single request (because the partitioning module may have partitioned data request into multiple sub-requests) and then provide the merge results back to Data Source Layer Interface 420. The merge results are then sent from Data Source Layer Interface 420 back to Business Logic layer 404.

FIG. 5 is a flowchart describing a high level process for setting up RDBMS Mapping Catalog 438 and/or LDAP Mapping Catalog 440. In one embodiment, the process of FIG. 5 is performed once for RDBMS Mapping Catalog 438 and once for LDAP Mapping Catalog 440.

In step 502 of FIG. 5, the logical object class (or classes) is determined. In one embodiment, the logical object class is determined by an administrator or designer of the system. In other embodiments, the logical object class can be determined automatically by a computer. In step 504, each of the attributes of the logical object class are classified. In one embodiment, all attributes are classified into one of eight classes. More detail about the classification will be described below. These classes are used for translating data between logical object class and RDBMS or LDAP. Each classification is translated differently. In other embodiments, more or less than eight classes are used. In Step 506, the Mapping Catalog is created based on the classification of attributes. More detail about the Mapping Catalog will be explained below. In step 508, the Mapping Catalog is stored.

Once the Mapping Catalog is stored, the system is now configured so that data can be translated between an RDBMS system and the business logic that uses the logical object class. Note that one of the advantages of the present invention is that the business logic is able to adapt to an existing RDBMS schema by using the Mapping Catalog. That is, in one embodiment, the mapping catalog is customizable for any normalized relational database schema.

Figure 6:
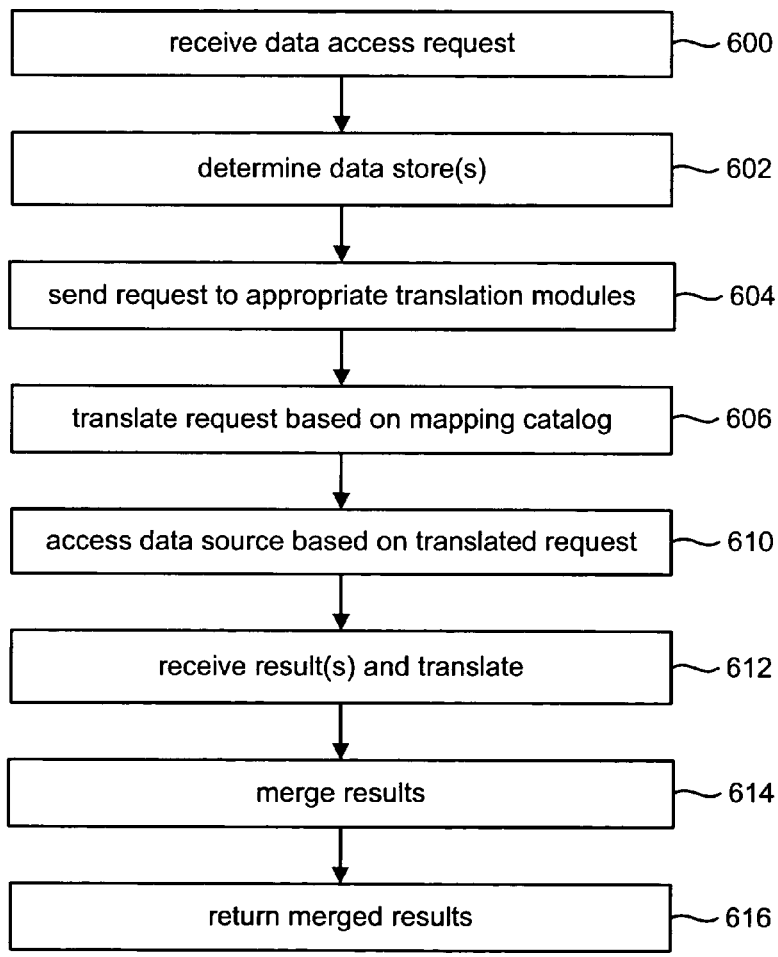
FIG. 6 is a flow chart describing one embodiment of a process for using a mapping catalog to support translation of requests from a logical object class format to SQL format.

FIG. 6 depicts a flow chart describing a high level description of how data is accessed using a logical object class and the RDBMS server (and/or other type of data store). In step 600, Data Source Layer Interface 420 receives a data access request from Business Logic layer 404. In step 602, Partitioning Module 422 will determine the appropriate data source(s) for the request. In step 604, the request is sent to the appropriate sub-modules in translation module 430.

The data request is translated based on the Mapping Catalogs in step 606. The translated data request is then communicated to the appropriate data store (e.g., relational database server 450 or LDAP server 452) in step 610. In step 612, the results form the data store, received by the transaction module 430, are translated back to the logical object class format. The results are then merged in step 614. The merged results are provided to Business Logic layer 404 in step 616.

As described above, the present invention provides for mapping between the logical object class and RDBMS. This mapping is based on the Mapping Catalog. To understand the mapping and the Mapping Catalog, it is important to understand how database schemes are designed. Database schema design involves identifying entities (a group of attributes that describes things like objects, persons, places, etc.) and their relationship in the problem domain. The relationship is generally depicted using Entity Relationship (ER) diagrams. The cardinality of the relationship between entities can be one-to-one, one-to-many, and many-to-many. Database schemes do not generally support many-to-many entity relationships; therefore, many-to-many entity relationships can be resolved by introducing another associative entity. A relation can connect two different instances of the same entity. Such relation is called recursive relationship.

Figure 7:
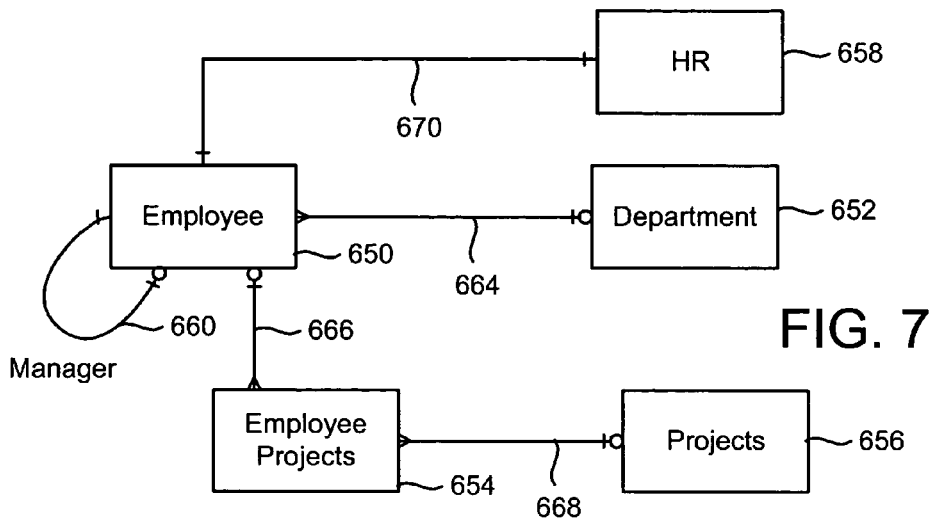
FIG. 7 is an example of an ER diagram.

FIG. 7 shows an ER diagram for Employees. The many-to-many relationship between Employees and Projects is broken by introducing Project Participants as an associative entity. FIG. 7 shows five entities: Employees 650, Department 652, Employee Projects 654, Project 656 and HR 658. The RDBMS schema definition (table, columns of table, primary key, foreign key) captures the entity definitions in the ER diagram. Each of the boxes in FIG. 7 corresponds to a table. Each of the lines 660, 662, 664, 666, 668 and 670 refer to a relationship between data and the tables. Line 660 refers to a one to zero or one relationship. Line 664 refers to a zero or one to one-or-many relationship. Line 666 refers to a zero or one to one-or-many relationship. Line 668 refers to a zero or one to one-or-many relationship. Line 670 refers to a one to one relationship.

Figure 8:
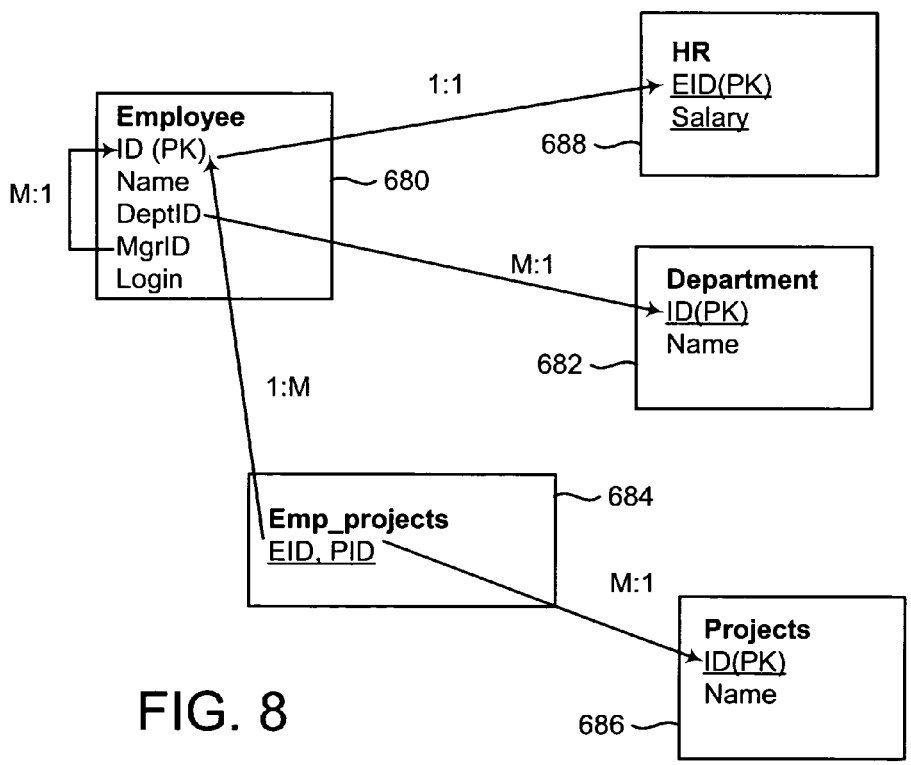
FIG. 8 graphically depicts an example of an RDBMS schema.

FIG. 8 shows the RDBMS table definitions corresponding to the ER diagram of FIG. 7. Each box in FIG. 8 is a table, which can have primary keys, foreign keys, and column names. FIG. 8 shows table 680 for employee information, table 682 for storing department information, table 684 for storing project participant information, table 686 for storing project information, and table 690 for storing human resources salary information. Employee table 680 has five columns. The first column is identification (ID), which serves as the primary key for employee table 680. Employee table 680 also includes a Name column (Name), department identification (DeptID), manager identification (MgrID), and Login name. Department table 682 includes identification (ID), which serves as the primary key and a Name column. Project Participants table 684 (also called Employee Project Table) includes a primary key that consists of an employee ID (EID) and a project ID (PID). Projects Table 686 includes identification (ID), which serves as the primary key, and a name (Name). The department ID (DeptID) stored in employee table 680 is a foreign key that points to the ID in the department table 682. A first employee will also have a MgrID and that will be a pointer to a second employee's ID, where that second employee is the manager of the first employee. In the employee-project table, the employee ID (EID) is a key to the employee table, pointing to the ID (primary key). The project ID (PID) is a key to the project table 686 and points to the ID column in project table 686. HR table 688 uses the employee ID (EID) as its primary key and also includes a column for employee salary. The EID of HR table 688 points to the same as the ID of Employee table 680.

For the above example, consider the following logical object class (employee) and its mapping to the example schema described above:

```
Employee (Logical object class)
    Requires
        ID
        NAME
        DEPARTMENT
        LOGIN
    May have
        MANAGER
        TEAM (multi-valued)
        PROJECTS (multi-valued)
        SALARY
```

During the configuration phase of the process depicted in FIG. 5, the Mapping Catalog will be defined. The logical object class is mapped to a master table and other tables linked to the master table through various key relationships. In the above example, the Employee table is a master table, since this is the first table accessed with any data access request. In one embodiment, an administrator configuring the system would determine which table is the master table.

The first step in creating the Mapping Catalog is to classify each of the attributes. Table 2, below, provides eight classifications (A-H). Table 2 uses the following abbreviations:
OC=Object Class (e.g., Employee)
PTOC=Primary table for object class (e.g., Employee table)
PK=Primary Key
PKC=Primary Key column
KC=Key Column
LT=Linking Table
LLT=Second level linking table (table linked with primary table through another table)
Ci=Columns

TABLE 2

LOC Attribute Mappings to columns of table in RDBMS

| Attribute Mapping Kind (Example logical object class attribute) | Mapped Column | Example of mapped column | Linking Expression with parent table primary key | Cardinality of mapped column wrt master table primary key | Description |
|---|---|---|---|---|---|
| A (ID) | PTOC.PKC | E.ID | — | Single (1-1) | Primary key from master table |

TABLE 2-continued

LOC Attribute Mappings to columns of table in RDBMS

| Attribute Mapping Kind (Example logical object class attribute) | Mapped Column | Example of mapped column | Linking Expression with parent table primary key | Cardinality of mapped column wrt master table primary key | Description |
|---|---|---|---|---|---|
| B (NAME) | PTOC.C1 | E.NAME | — | Single (1-1) | Column from master table (directly dependent on primary key value) |
| C (Manager Name or Department Name) | PTOC.C1 (Unique) | E.NAME Or D.NAME | (PTOC.C3 = LT.PKC) [master-link-column = master-linked-column] | Single (1-1) | Unique column (C1) from a table dependent on non-primary key column value of master row. |
| D (Employee Salary stored in HR table) | LT.C1 (non unique) | HRInfo.SALARY | (PTOC.PKC = LT.PKC) [master-link-column = master-linked-column] | Single (1-1) | The primary key of master table is the linking attribute with primary key of the linking table and the mapped attribute is not unique column in the linked table. |
| E (Project Ids) | LT.KC1 | EP.PID | (PTOC.PKC = LT.KC2) [master-link-column = master-linked-column] | Multi-valued (1-m) | Column part of primary key in another table, whose another key part is linked to the primary key value of master row. |
| F (Project Names) | LLT.C1 (Unique) | P.NAME | (PTOC.PKC = LT.KC2) and (LLT.PKC = LT.KC1) [(master-link-column = master-linked-column) and (table-link-column = table-linked-column)] | Multi-valued (1-m) | Unique column value in another table dependent on E values. |
| G (Team Member IDs) | PTOC.PKC | E.ID | (PTOC.C3 = PTOC.PKC) [master-link-column = master-linked-column] | Multi-valued (1-m) | Primary key column values from table whose non-primary key column matches master rows primary key value. |
| H (Team Member Names) | PTOC.C1 (Unique) | E.NAME | (PTOC.C3 = PTOC.PKC) [master-link-column = master-linked-column] | Multi-valued (1-m) | Unique column value from table dependent on G values. |

Table 2 is used to classify each attribute into one of the eight classes (also called attribute mapping kind). Table 2 includes six columns. The first column (attribute mapping kind) lists the name of the classification and provides an example. The last column of Table 2 provides a Description of each of the classifications. Based on this Description, an administrator or computer program (in which case the classification is automatically done by a computer) is performed. For example, the first classification, Class A, pertains to attributes which are the primary keys in the master table. In this example, the ID is the primary key and is a Class A attribute. Using the last column of Table 3, all of the attributes are classified (see step 504 of FIG. 5).

Step 506 in FIG. 5 includes creating the Mapping Catalog. In one embodiment, the Mapping Catalog is created based on the information in Table 2. One embodiment of the Mapping Catalog includes a table with six columns: (1) Attribute Column, (2) Mapped-Column, (3) Master-Link-Column, (4) Master-Linked-Column, (5) Mapped-Table-Link-Column, and (6) Mapped-Table-Linked-Column. Other embodiments can implement the Mapping Catalog with different data structures and/or based on different data. The Attribute Column of the Mapping Catalog stores the name of the attribute from the logical object class. The second column of Table 2 (titled "Mapped-Column") indicates what information should be placed in the Mapped-Column of the Mapping Catalog.

Table 3, below provides an example of a Mapping Catalog created based on Table 2 and the example above.

TABLE 3

Employee LOC Attribute Mapping

| Attribute | Mapped-Column (* - Multiple values) | Master-Link-Col. | Master-linked-column | Mapped-Table-link-column | Mapped-Table-linked-column |
|---|---|---|---|---|---|
| ID | Employee.ID | — | — | — | — |
| NAME | Employee.Name | — | — | — | — |
| LOGIN | Employee.Login | — | — | — | — |
| MANAGER | Employee.Name | MgrId | Employee.ID | — | — |
| DEPART. | Department.Name | DeptId | Department.ID | — | — |
| PROJECTS | Projects.Name | ID | Emp_projects.EID | Projects.ID | Emp_projects.PID |
| TEAM | Employee.Name | MgrId | Employee.ID | | |

The last four columns of the Mapping Catalog are filled in based on information in the fourth column ("Linking Expression with Parent Table Primary Key") of Table 2. Note that Table 3 includes a row for seven attributes in the logical object class Employee, described above. The first attribute, ID, is a Class A attribute. The Mapped Column in Table 3 is PTOC.PKC, which is the primary key for the master table—Employee.ID. The fourth column of Table 2 indicates that no information should be added to the last four columns of Table 3 for this entry.

The second attribute in Table 3 is the NAME attribute, which is a Class B attribute. The Mapped Column in Table 2 indicates that the Mapped Column in the Mapping Catalog should indicate the appropriate column for the attribute in the master table Employee. In this case, the mapped column is Employee.Name. The fourth column of Table 2 indicates that no information should be added to the last four columns of Table 3 for this entry.

The third attribute is LOGIN (which is not shown in the schema or ER drawings of FIGS. 7 and 8). LOGIN is a Class B attribute. The Mapped Column in Table 2 indicates that the Mapped Column in the Mapping Catalog should indicate the appropriate column for the attribute in the master table. In this case, the mapped column is Employee.Login. The fourth column of Table 2 indicates that no information should be added to the last four columns of Table 3 for this entry.

The fourth attribute is MANAGER, which is a Class C attribute. The second column of Table 2 indicates that the Mapped Column for the Mapping Catalog should indicate the appropriate column in the master table, which in this case is Employee.Name. The fourth column of Table 2 indicates that the Master-Link-Column of the Mapping Catalog should include the appropriate column of the master table, which is MgrId. This is the attribute which is the source of the link/key. The Master-Linked-Column should include the primary key column of the linking table, which in this case is Employee.ID and is the destination of the link/key.

The fifth attribute is DEPARTMENT name, which is also a Class C attribute. The Master-Link-Column is equal to the appropriate column in the master table and the Master-Linked-Column is equal to the column in the linking table for the primary key. The linking table is the Department Table.

The sixth attribute is PROJECTS, which is a Class F attribute. Note that Class E, F, G and H are multi-valued attributes. The mapped column for a Class F attribute is the appropriate column of the second level linking table (e.g., Project Table 686). For a Class F attribute, data is populated in the Master-Link-Column, Master-Linked-Column, Mapped-Table-Link-Column, and Mapped-Table-Linked-Column. The Master-Link-Column is populated with the primary key column of the master table and the Master-Link-Column is the appropriate key column for the linking table, for example, Employee.ID and Emp_projects.empid, respectively. The Mapped-Table-Link Column is the primary key column for the second level linking table (e.g., Projects.ID) and the Mapped-Table-Link Column is the appropriate key column for the linking table (e.g., EMP_Projects.PID).

III. Translating Data Access Requests

Step 606 of FIG. 6 includes translating data access requests. In one embodiment, an access request may be in the following format:

ldap://[hostname:portnum]/[Searchbase]?[attributes]?
   [subtype]?[filter]

In one embodiment, only [attributes] and [filter] of the above URL will be applicable to RDBMS data sources. The other components (if specified by callers) can be used by the LDAP data sources. In one embodiment, if an operation involves a logical object class, then hostname and port number for a data source will be used from the Data Source Profile information in the Mapping Catalog. Subtype and Searchbase assumes DIT structure for LDAP. To improve search performance, the LDAP translation module can use a specified searchbase, or derive the searchbase information from an LDAP filter to DN suffix mappings in the Mapping Catalog.

A. Search

Figure 9:
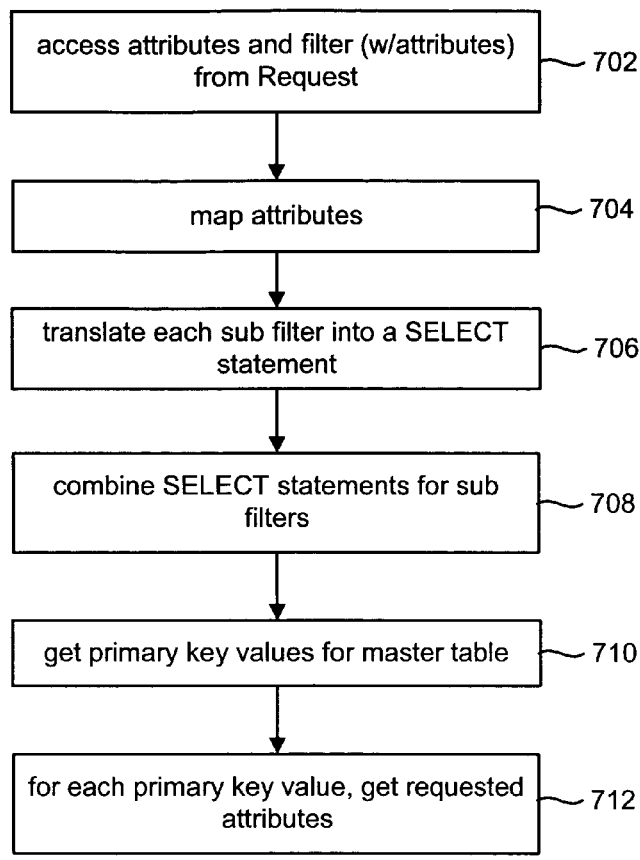
FIG. 9 is a flow chart describing one embodiment of a process for translating and performing SEARCH requests.

FIG. 9 is a flow chart describing a process for performing steps 606 and 610 of FIG. 6 for a SEARCH operation. In step 702, the [attributes] and [filter] of the access request are read. In step 704, each of the attributes in the [attributes] and [filter] of the access request are mapped to the relational database using the Mapping Catalog. A filter may be composed of sub-filters. For example, the filter (&(manager=Jill) (project_names=HRsystem)) has two sub-filters. The first sub-filter is (manager=Jill) and the second sub-filter is (project_names=HRsystem). In step 708, each sub-filter is translated into a separate SELECT statement. In step 708, each of the SELECT statements for the sub-filters are combined into one aggregate SELECT statement. In step 710, the aggregate SELECT statement built in step 708 is issued to the database in order to get the primary key values of the rows of the master table that store the data being searched for. In step 712, the requested attributes from [attributes] of the access request are obtained for each primary key value returned in step 710. These attributes will be translated and returned to the business logic as described above.

Step 706 of FIG. 9 includes translating sub-filters. Table 4 provides the translation templates for translating sub-filters, including providing a template for each class of attribute. Variables in the templates are from the Mapping Catalog.

TABLE 4

SQL queries for LDAP

| Attribute Class | SQL statement for filter (attribute <op> value) |
|---|---|
| A | mapped-column <op> value |
| B | Select master-table.primary-key-column from master-table where mapped-column <op> value |
| C | Select master. primary-key-column From master-table master, mapped-column-table child Where (master.master-link-column = child.master-linked-column) and (child.mapped-column <op> value) |
| D | Select master-linked-column From mapped-column-table Where mapped-column <op> value |
| E | Select master-linked-column from mapped-column-table where mapped-column <op> value |
| F | Select master-linked-column From master-linked-column-table, mapped-column-table Where (table-link-column = table-linked-column) and (mapped-column <op> value) |
| G | Select master-link-column From master-table Where mapped-column <op> value |
| H | Select master-link-column From master-table Where mapped-column <op> value |

Table 5 provides examples of translating sub-filters using the templates of Table 4. Note that example SQL statements of Table 5 are based on the example above.

TABLE 5

Example SQL queries

| Attribute | Example SQL statement for filter |
|---|---|
| ID | Select employee.ID From employee |
| Name=John | Select employee.ID From employee where (employee.Name='John') |
| Login = jsmith | Select employee.ID From employee where (employee.Login='jsmith') |
| Department Name = Sales | Select employee.ID employee master, department child Where (master.DeptId = child.Id) and (child.Name = 'Sales') |
| Manager Name = Smith | Select employee.ID From employee master, employee child Where (master.mgrid = child.id) and (child.name='Smith') |
| Project Names = Big | Select emp_projects.empid From emp_projects, projects Where (emp_projects.projid = projects.id) and (projects.name = 'Big') |

Figure 10A:
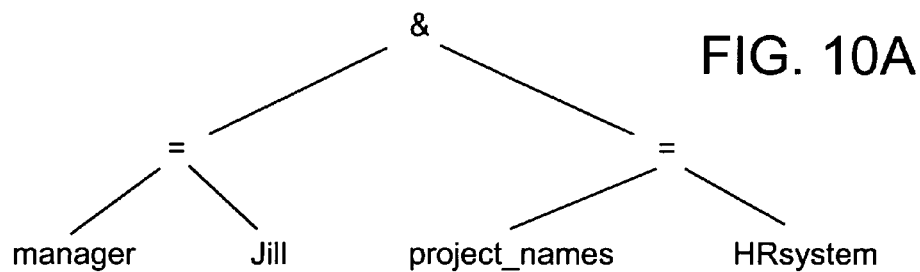
FIG. 10A depicts an example of an expression tree.
Figure 10:
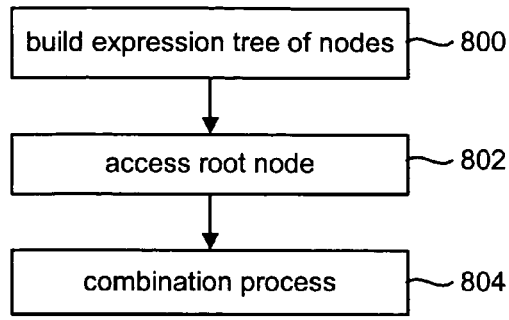
FIG. 10 is a flow chart describing one embodiment of a process used when combining sub-filters.

Step 708 of FIG. 9 includes combining the sub-filters. FIG. 10 depicts a flow chart describing the process of combining the sub-filters. In step 800, an expression tree of is built for the filter. That is, a tree (e.g. a search tree) is set up where each node is an operator, attribute or value from the filter in the access request. The top node, also called the root node, is the highest level operator from a lexical standpoint. For example, the filter (&(manager=Jill)(project_names=HRsystem)) is used to create the expression tree of FIG. 10A. In step 802, the root node is accessed. For example, in FIG. 10A, the node for the AND (&) operator is accessed. In step 804, the "combination process" is performed.

Figure 11:
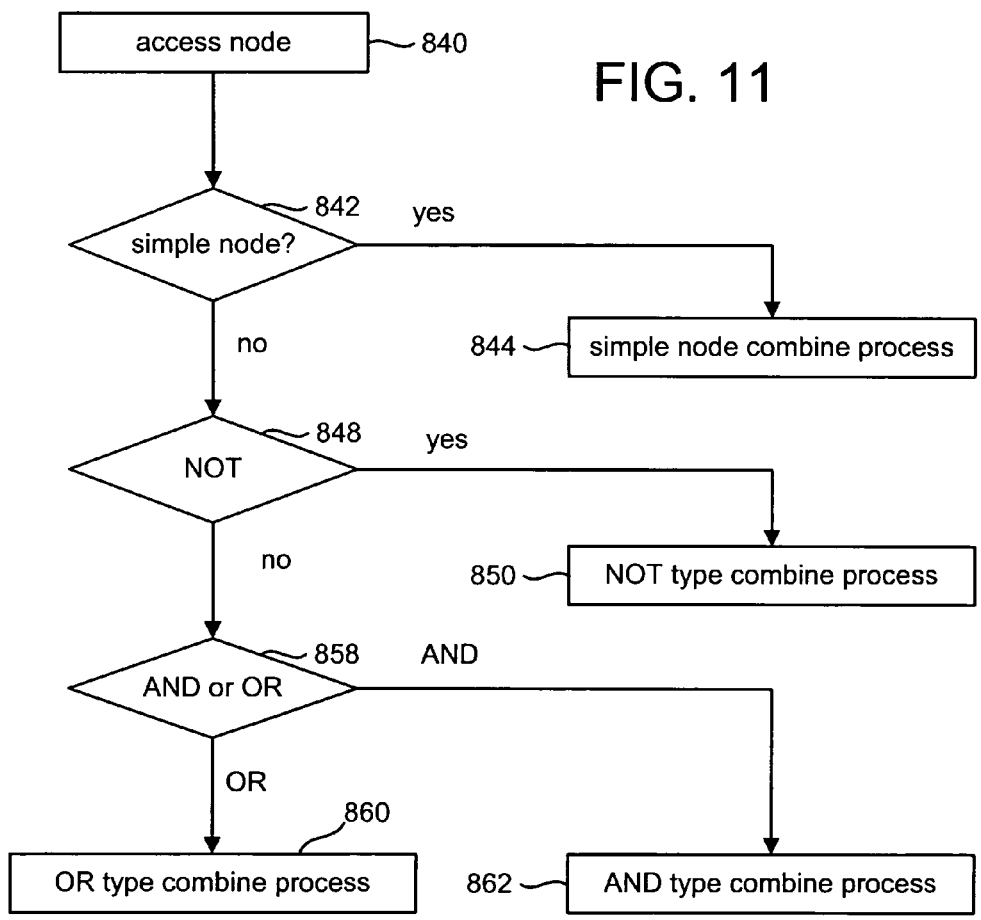
FIG. 11 is a flow chart describing one embodiment of a process used when combining sub-filters.

FIG. 11 is a flow chart describing the "combination process" of step 804. In step 840, the current node is accessed. If it is the start of the "combination process" then the root node is accessed. In step 842, it is determined whether the node is a simple node. For example, whether the node is one of the following operators: =, <, <=, >, >+, ~=, =*. If the node is a simple node, then the simple node combine process (described below) is performed in step 844. If the node is not a simple node, then in step 848 it is determined whether the node is a NOT operator. If the node is a NOT operator, then the NOT type combine process (described below) is performed in step 850. If the node is not a NOT operator, then in step 858 it is determined whether the node is an AND or Or operator. If the node is an AND operator, then the AND type combine process (described below) is performed in step 862. If the node is an OR operator, then the OR type combine process (described below) is performed instep 860.

Figure 12:
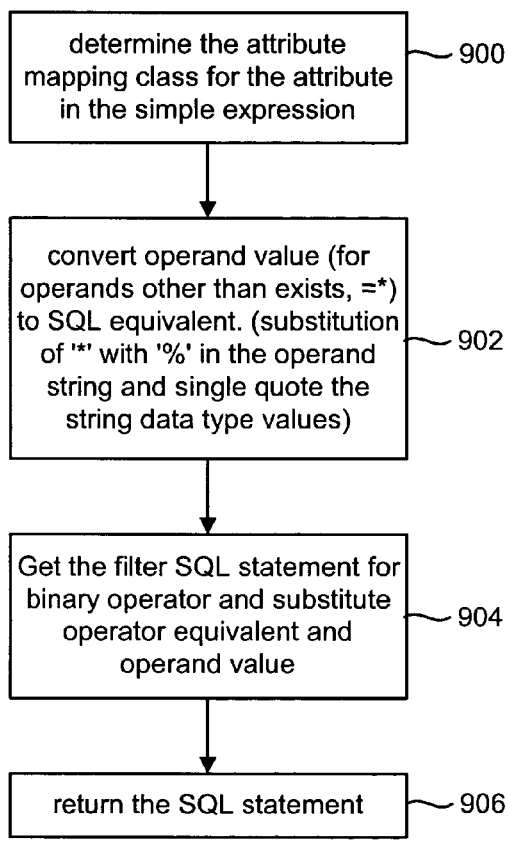
FIG. 12 is a flow chart describing one embodiment of simple node combining process.

FIG. 12 is a flow chart describing the simple node combine process of step 844. In step 900, the attribute mapping class (e.g., A, B, C, etc.—see above) is determined for the attribute(s) in the expression. In step 902, operand value (for operands other than exists, =*) is converted to a SQL equivalent (in some cases, substitution of '*' with '%' in the operand string and single quote the string data type values). In step 904, the system gets the filter SQL statement for the binary operator and substitutes the operator equivalent and operand value. In step 906, the SQL statement is returned.

Figure 13:
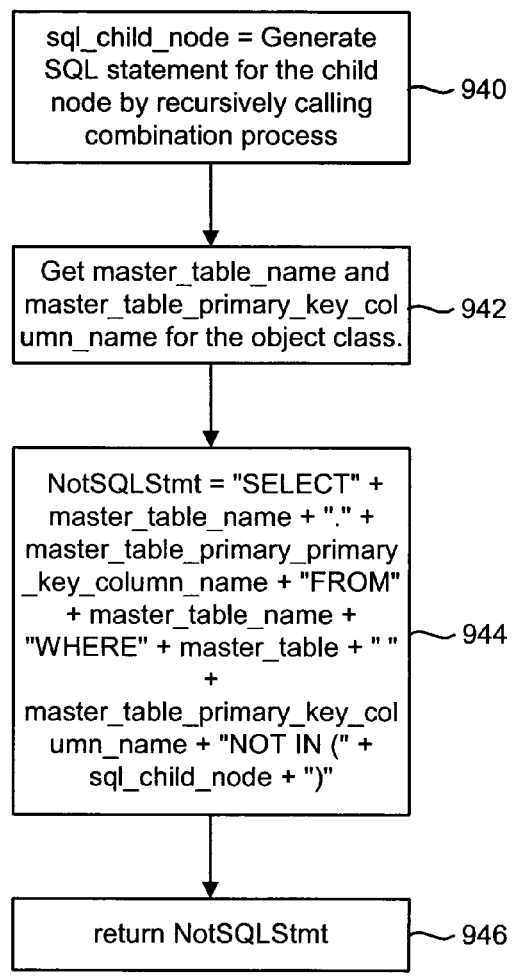
FIG. 13 is a flow chart describing one embodiment of NOT type combining process.

FIG. 13 is a flow chart describing the NOT type combine process of step 850. In step 940, the SQL statement for the child node is generated by recursively calling the combination process (FIG. 11). In step 942, the master_table_name and master_table_primary_key_column_name are accessed. In step 944, the SQL statement is created: NotSQLStmt= "SELECT"+master_table_name+"."+master_table_primary_primary_key_column_name+"FROM"+master_table_name+"WHERE"+master_table+"."+master_table_primary_key_column_name+"NOT IN ("+sql_child_node+")". In step 946, the SQL statement, labeled as NotSQLStmt is returned.

Figure 14:
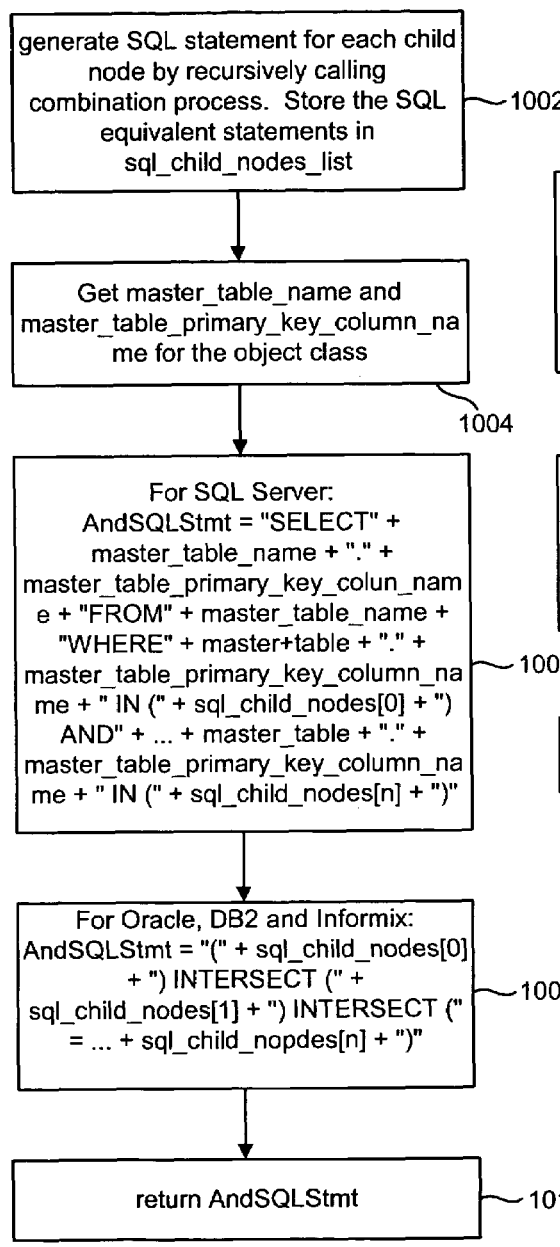
FIG. 14 is a flow chart describing one embodiment of AND type combining process.

FIG. 14 is a flow chart describing the AND type combine process of step 862. In step 1002, SQL statements for each child node are generated by recursively calling the combination process (FIG. 11). These SQL statements are stored in sql_child_nodes_list. In step 1004, master_table_name and master_table_primary_key_column_name are accessed. Steps 1006 and 1008 include creating the SQL statement. If the database is a SQL Server, then in step 1006 the following SQL statement is created: AndSQLStmt="SELECT"+master_table_name+"."+master_table_primary_key_colun_name+"FROM"+master_table_name+"WHERE"+master+table+"."+master_table_primary_key_column_name+"IN ("+sql_child_nodes[0]+") AND"+ . . . +master_table+"."+master_table_primary_key_column_name+"IN ("+sql_child_nodes[n]+")". If the database is a an Oracle, DB2 or Informix database, then in step 1008 the following SQL statement is created: AndSQLStmt="("+sql_child_nodes[0]+") INTERSECT ("+sql_child_nodes[1]+") INTERSECT ("= . . . +sql_child_nopdes[n]+")". In step 1010, the SQL statement, labeled as ANDSQLStmt is returned.

Figure 15:
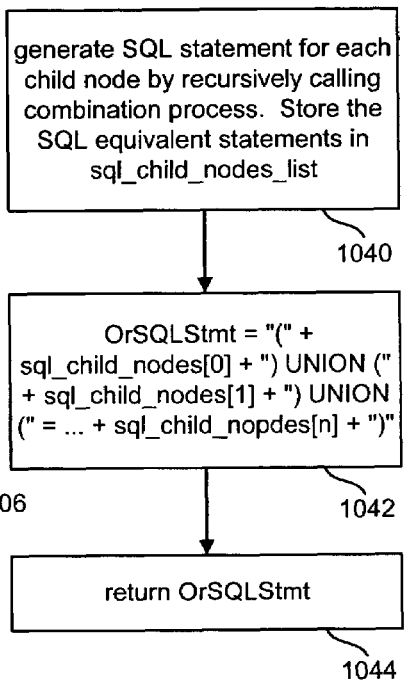
FIG. 15 is a flow chart describing one embodiment of OR type combining process.

FIG. 15 is a flow chart describing the OR type combine process of step 860. In step 1040, SQL statements for each child node are generated by recursively calling combination process (FIG. 11). These SQL statements are stored in sql_child_nodes_list. In step 1042, the SQL statement is created: OrSQLStmt="("+sql_child_nodes[0]+") UNION ("+sql_child_nodes[1]+") UNION ("= . . . +sql_child_nopdes[n]+")". In step 1044, the SQL statement, labeled as ORSQLStmt is returned.

For the EXIST operator, change the mapped column <op> value to mapped_column IS NOT NULL in column 2 of table 4. For example, (Name=*) corresponds to SELECT employee.ID from Employee where employee.name IS NOT NULL.

Step 712 of FIG. 9 includes getting the requested attributes for each primary key value returned in step 710. In one embodiment, the primary key values returned in step 710 are used to construct SELECT statements to access the requested attributes from the data access request received in step 600 of FIG. 6. Table 6 provides the templates for constructing SELECT statements that use the primary key values returned in step 710 in order to access the requested attributes from the data access request. The variables in the templates are from the Mapping Catalog. In one embodiment, a separate SELECT statement is constructed for each attribute in the [attributes] of the access request. In another embodiment, a separate SELECT statement is constructed for each primary key value for each attribute in the [attributes] of the access request. In other embodiments, a SELECT statement is constructed for each primary key value and the returned data is parsed to access the one or more attributes in the [attributes] of the access request. In some instances of some embodiments, one SELECT statement can be use to access all attributes.

TABLE 6

SQL queries for getting attribute values for a selected data record

| Attribute mapping kind | SQL statement for getting attribute value(s) |
|---|---|
| A | — |
| B | Select mapped-column from master-table Where master-table.primary-key-column = ? |
| C | Select child.mapped-column From master-table master, mapped-column-table child Where (master.master-link-column = child.master-linked-column) and (master.primary-key-column = ?) |
| D | Select mapped-column From mapped-column-table Where master-linked-column = ? |
| E | Select mapped-column From mapped-column-table Where master-linked-column = ? |
| F | Select mapped-column From master-linked-column-table, mapped-column-table Where (table-link-column = table-linked-column) and (master-linked-column = ?) |
| G | Select mapped-column From master-table Where master-link-column = ? |
| H | Select mapped-column From master-table Where master-link-column = ? |

Table 7 provides examples of SELECT statements created according to Table 6. Note that example SQL statements of Table 7 are based on the example above.

TABLE 7

Example SQL Queries Getting Attributes

| Attribute Name | SQL statement for getting attribute value |
|---|---|
| ID | — |
| Name | Select Employee.name from Employee where Employee.id = ? |
| Login | Select Employee.login from Employee where Employee.id = ? |

TABLE 7-continued

Example SQL Queries Getting Attributes

| Attribute Name | SQL statement for getting attribute value |
|---|---|
| Department Name | Select child.Name From employee master, department child Where (master.DeptID = child.ID) and (master.id = ?) |
| Manager Name | Select child.Name From employee master, employee child Where (master.mgrId = child.id) and (master.id = ?) |
| Team Member Names | Select employee.Name From employee Where employee.MgrId = ? |
| Project Names | Select projects.name From projects, emp_projects Where (projects.id = emp_projects.projid) and (emp_projects.empid = ?) |

Below is an example of a translation. The LDAP filter being translated is: ldap: ///?name??(&(manager=Minoo) (project_names=performance). The result of the translation is:

```
select employee.name from employee
where employee.id in
   (select employee.id from employee where employee.id in
      (select master.id
      from employee master, employee child
      where (master.mgrid = child.id) and
      (child.name = 'Minoo'))
   and employee.id in
      (select emp_projects.empid
      from emp_projects, projects
      where (emp_projects.projid = projects.id)
      and (projects.name = 'performance'))
```

If a filter expression involves only single valued attributes mapped to a column from the master table of mapping kinds A and B only, then one embodiment provides an optimization to the translation that will generate the following SELECT statement. Note that Sql(filter) is a SQL equivalent of the LDAP filter obtained by replacing attribute names with table column names in infix representation of the filter.

Select master-table.primary-key-column
where sql(filter)

If a filter expression involves only single valued attributes of mapping kinds A, B, C, and D, then a Join query can be generated to get the correct result. The Join query involves participant tables defining a dynamic view of the data. The sql(filter) selects rows from the dynamic view. The following statement will be generated for the filter. The alias set {ctab1, . . . , ctabm} is generated for each attribute of mapping class C in the filter. The set is based on unique master-link-column for the attribute. The alias set {dtab1, . . . , dtabn} is generated for each attribute of mapping class D in the filter. The set is based on the unique master-linked-column for the attribute.

```
Select master-table.primary-key-column
From master-table atab, mapped-table-c1 ctab1,...,
   mapped-table-cm ctabm,
      Mapped-table-d1 dtab1, ..., mapped-table-dn dtabn
Where (atab.master-link-column-for-c1 =
   ctab1.master-linked-column-for-c1)
and
   ...
   (atab.master-link-column-for-cm =
   ctabm.master-linked-column-for-cm)
```

```
        and
                (atab.master-link-column-for-d1 =
                dtab1.master-linked-column-for-d1)
        and
                ...
                (atab.master-link-column-for-dn =
                dtab1.master-linked-column-for-dn)
        and
                (sql(filter))
```

The above discussion explains how to translate LDAP SEARCH operations to SQL SELECT operations. The translation process is also used to translate LDAP ADD operations to SQL INSERT operations.

B. Add

Figure 16:
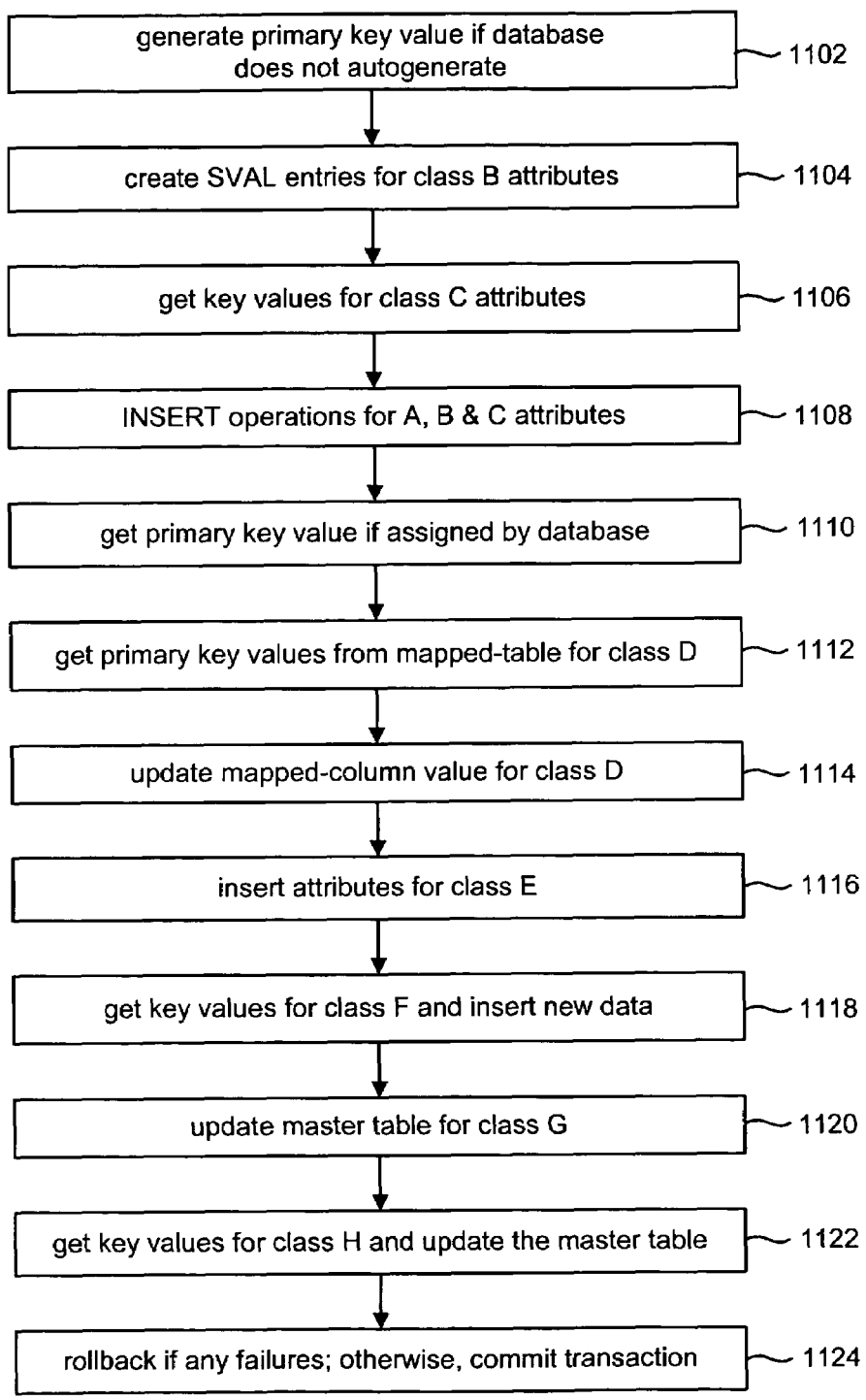
FIG. 16 is a flow chart describing one embodiment of a process for translating and performing ADD requests.

FIG. 16 is a flow chart describing a process for performing steps 606 and 610 of FIG. 6 for an ADD operation. When creating a new entry in a database, some RDBMS servers will automatically generate a new primary key for the new entry in the database. If the database server does not generate unique identifier for the primary key, then system will provide a function to generate the new primary key. A numeric sequencing function configurable at table level can be provided if the database server does not generate the primary key values. A non-numeric primary key is not efficient for database access, and the user will have to register a function to generate a non-numeric primary key value. For each record entry to be inserted in a database that does not automatically generate the primary key, a primary key value (pkvalue) will be generated and saved as a tuple (primary-key, pkvalue) in a single-value-attribute-list (SVAL) for the master table. Each table to receive data for the new entry will have a SVAL, which contains a set of key—value pairs.

For class B attributes, a (mapped-column, value) tuple is added to the SVAL for the master table. For class C attributes, existence of the attribute value (cvalue) is checked in the linked table and the corresponding primary key value from the linked table is obtained (pkvalue-for-cvalue). If pkvalue-for-cvalue does not exist, then the add record entry operation is aborted. In other embodiments, the data can be added. In some embodiments, the data must be added previously as part of a configuration step or maintenance. The tuple (master-link-column, pkvalue-for-cvalue) is added to the SVAL for the master table. For inserting values for class D attributes, the existence of pkvalue is checked in the mapped table. If the pkvalue exists in the mapped table then d-value is updated in the mapped-table corresponding to the pkvalue. Otherwise the add record entry operation is aborted. For each attribute value for a class E attribute, the tuple (attrib-value, pkvalue) is added to the SVAL for the linking table. For each attribute value for class F attributes, the primary key value is obtained from the linking table. The tuple (primary-key-value-from-linking-table, pkvalue-from-master) is added to the SVAL for the intermediate table. For each attribute value of class G attributes, the attribute master-link-column needs to be updated to pkvalue in the master table identified by the attribute value of G. For each attribute value of class H attributes, the primary key values for the attribute values h from the master table are obtained. The master-link-column needs to be updated to the pkvalue in the master table identified by the primary key values.

There are at least two possibilities for adding an entry with class C and D attributes. The first possibility is to create a new row for the attribute value dependent on keyvalue from master table in the mapped-column-table. The second possibility is to assume existence of the row (dependent on keyvalue from master table in the mapped-column-table) and update the mapped-column value to new attribute value. The above steps for adding an entry record have described the second option. Support for the first option can also be configured during mapping of the logical object class.

The translation module will generate INSERT statements for the tuples in the SVALs. For example: INSERT into PTOC(colname, ..., colname) values (pkvalue, ..., valn).

More details for adding the new entry is provided with respect to FIG. 16. In step 1102, a primary key for the master table is generated. If the database automatically generates a primary key, then step 1102 is not performed. In step 1104, the SVAL is created for class B attributes. In step 1106, the key values for the class C attributes are obtained. For example a SELECT statement can be used: Select master-linked-column from mapped-column-table where mapped-column=cvalue. In step 1108, attribute values for class A, B and C attributes are added to the master table. For example, the following INSERT statement adds a pkvalue for a class A attribute, a bvalue for a class B attribute or cvalue for a class attributre: INSERT into PTOC (Master-table.primary-key, Mapped-column, Master-link-column) values (pkvalue, bvalue, cvalue).

In step 1110, for the cases where the database automatically assigns a primary key for the master table, that primary key is obtained using a SELECT operation. In step 1112, SELECT statements are executed to obtain the primary key values from the mapped-table for class D attributes. For example: SELECT master-linked-column FROM mapped-column-table WHERE master-linked-column=?. In step 1114, the mapped-column value for class D attributes are updated, for example: UPDATE mapped-column-table SET mapped-column=dvalue Where master-linked-column=pkvalue. If the mapped-column value for the class E attributes doesn't exist, then insert it: INSERT into mapped-column-table(master-linked-column, mapped-column) values(pkvalue, dvalue). In step 1116, the attribute values are inserted for class c attributes. For example: INSERT into mapped-column-table (mapped-column, master-linked-column) values (Evalue, pkvalue).

In step 1118, the key values (fkeyvalues) for each class F attribute are obtained using, for example, a SELECT statement: SELECT mapped-table-link-column from mapped-column-table where mapped-column in (Fvalues). The key values (fkeyvalues) obtained are inserted into the table for master-linked-column using, for example, the following INSERT statement: INSERT into master-linked-column-table (mapped-table-linked-column, master-linked-column) values (FKeyValues, pkvalue).

In step 1120, the master table is updated for class G attributes. For example: UPDATE master-table set master-link-column=pkvalue where master-table.primary-key in (Gvalues). In step 1122, the key values (HkeyValues) are obtained for each class H attribute, for example, using a SELECT statement: SELECT master-table.primary-key from master-table where mapped-column in (Hvalues). The master table is then updated, for example, as follows: UPDATE master-table set master-link-column=pkvalue where master-table.primary-key in (HkeyValues). 12. If any of the above steps fail, then rollback the transaction; otherwise, commit the transaction in step 1124.

To help explain the above, the following example is provided. Consider a request to add the following new entry:

TABLE 8

Example

| Attribute | Attribute Mapping Kind | Value |
|---|---|---|
| ID | A | (generated by DB) |
| Name | B | Vikas |
| Dept. | C | Engineering |
| Manager | C | Joan |
| Projects | F | (id-XML SDK, performance) |

In step 1104, an SVAL is created that includes the following tuple (name, Vikas). In 1106, the following SELECT statements are used to get the key values for the class C attributes: SELECT department.ID from department where name='engineering' AND SELECT employee.ID from employee where employee.name='Joan'. In step 1108, the following INSERT command is used: INSET into employee(Name,deptID, MgrID) values ('vikas', 2, 6), assuming that "2" was returned for the "SELECT department.ID" operation and "6" was returned for the "SELECT employee.ID" operation. In step 1110, the primary key (assume it is 24) is obtained with the following SELECT statement: SELECT employee.ID from employee where employee.Name='vikas' In step 1118, the key values for the projects attribute is obtained with the following SQL statement: SELECT projects.ID from projects where projects.name in ('id-XML SDK', 'performance'). Assuming that the result set is {2, 4}, the following INSERT statement are executed: INSERT into emp_projects(PID, EID) values (2, 24), INSERT into emp_projects(PID, EID) values (4, 24).

C. Delete

Figure 17:
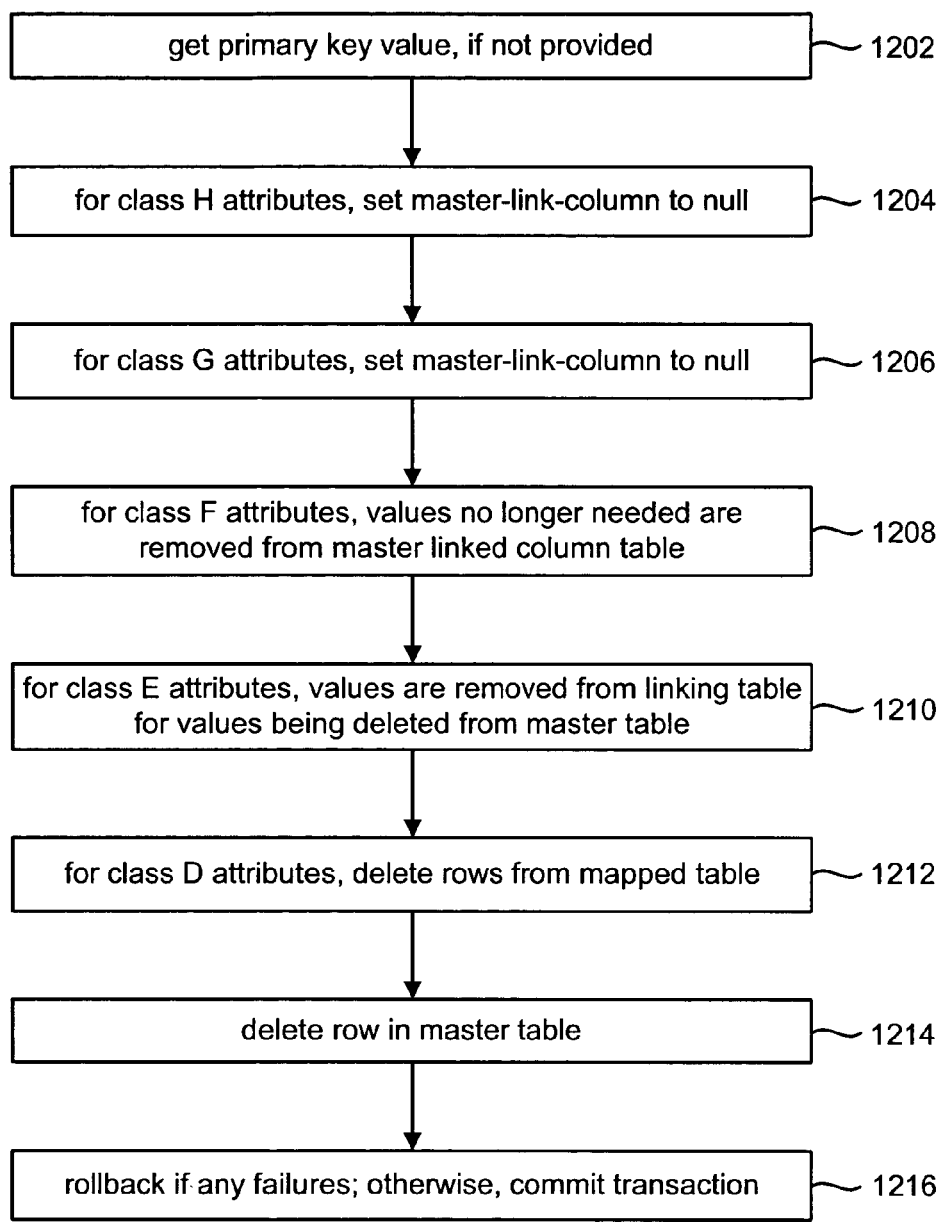
FIG. 17 is a flow chart describing one embodiment of a process for translating and performing a DELETE operation.

FIG. 17 is a flow chart describing a process for performing steps 606 and 610 of FIG. 6 for a DELETE operation. In step 1202, the primary key value in the master table for the entry being deleted is obtained. In some cases, the primary key value in the master table for the entry being deleted is provided in the LDAP DELETE request and step 1202 need not be performed. In other cases, the LDAP delete request will not include that primary key, but will uniquely identify the entry using a unique attribute (or attributes). When a unique attribute is provided, the primary key value in the master table for the entry being deleted is obtained using, for example, the following SQL statement: =SELECT masetr-table.primary-key from master-table where master-table.<unique-column>=?.

In steps 1204 and 1206 of FIG. 17, the master-link-column of H and G attributes are set to null using, for example, the following SQL statement: Update master-table set master-link-column=null where master-link-column=primary-key-value (for record being deleted). In step 1208, values for class F attributes no longer needed are removed from the master-linked-column-table using, for example, the following SQL statement: DELETE from master-linked-column-table where master-linked-column=? Note that in some cases it may be desirable to not delete the class F attribute values. In step 1210, values for class E attributes are removed from linking tables for values deleted from the master table using, for example, the following SQL statement: DELETE from mapped-table where master-linked-column=? Note that in some cases it may be desirable to not delete the class E (or other classes) attribute values. In step 1212, the rows in the mapped table for the class D attributes are deleted using, for example, the following SQL statement: DELETE from mapped-column-table where master-linked-column=? In step 1214, the row in the master table is deleted using, for example, the following SQL statement: DELETE Delete from master-table where master-table.primary-key=pkvalue—(pkvalue is from step 1202). If any of the above steps fail, then rollback the transaction; otherwise, commit the transaction in step 1216. Note that class B attributes will be removed when the row for the primary key in the master table is deleted. Attribute values of class C will be unlinked from the entry being deleted upon such deletion.

D. Modify

Figure 18:
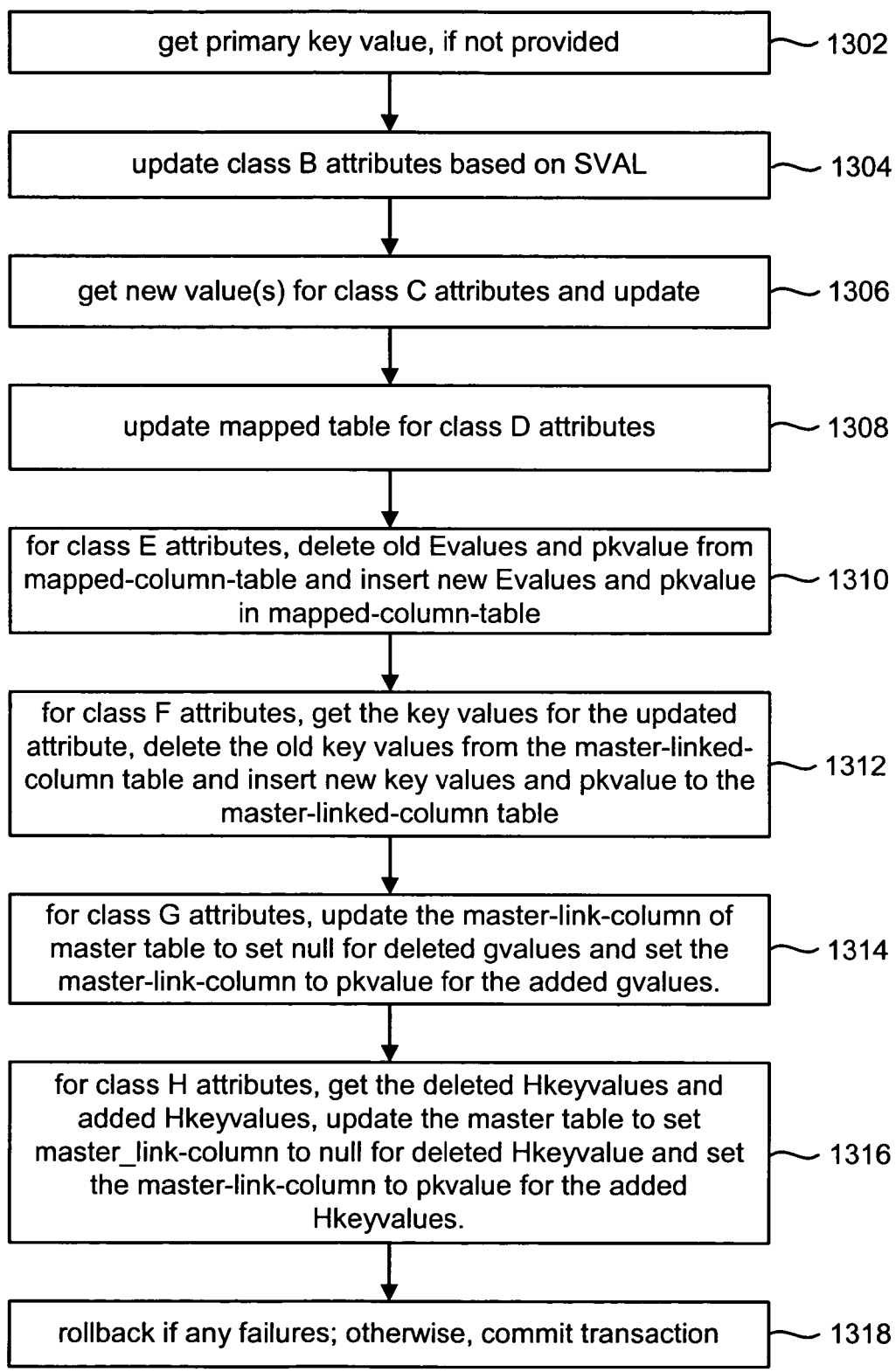
FIG. 18 is a flow chart describing one embodiment of a process for translating and performing a MODIFY operation.

FIG. 18 is a flow chart describing a process for performing steps 606 and 610 of FIG. 6 for a MODIFY operation. In general, a LDAP MODIFY operation is translated to a SQL UPDATE operation. A primary key value or a unique attribute value(s) should be provided for update of an entry record. If the primary key value (pkvalue) is not provided, then it is obtained using the unique attribute. Updates of primary key values (attribute class A) are not allowed. Updates of class B attributes will include the addition of a tuple (mapped-column, value) into a SVAL for update of master-table. If update results in change of the unique attribute of the object class, then get the pkvalue for the object based on the old value of the unique attribute. Updates of class C attributes will result in updating the master-link-column with the master-linked-column value corresponding to the new mapped-column value. Updates of class D attributes will result in updating the mapped-column value corresponding to the pkvalue in the master-linked-column.

Updates of multi-valued attribute can result in change of membership. The old values will be removed and the new member will be added to the attribute value set. The operation context will have an old value set and a new value set. The deleted set and added set can be constructed from the old and new value set. Updates of class E attributes will result in deleting entries (pkvalue, deleted-e-value) for deleted values from the mapped-column-table and inserting entries (pkvalue, added-e-value) for added values. Updates of class F attributes will result in getting key values corresponding to deleted values and added F attribute values, deleting entries (pkvalue, deleted-f-key-value) for deleted values from the mapped-table-linked-column table, and adding entries (pkvalue, added-f-key-value) to the table. Updates of class G attributes will result in updating the master-link-column to null for all deleted G values (G values being removed) and updating the master-link-column to the pkvalue for added entries (G values being added). Updates of class H attributes will result in getting key values for deleted and added H values. Master-link-column values for old key values will be set to null and master-link-column values for new key values will be set to pkvalue. More details are provided below with respect to FIG. 18.

In step 1302 of FIG. 18, the primary key value in the master table for the entry being deleted is obtained. In some cases, the primary key value in the master table for the entry being deleted is provided in the LDAP delete request and step 1302 need not be performed. In other cases, the LDAP modify request will not include that primary key, but will uniquely identify the entry using a unique attribute (or attributes). When a unique attribute is provided, the primary key value in the master table for the entry being deleted is obtained using, for example, the following SQL statement: =SELECT master-table.primary-key from master-table where master-table.<unique-column>=? In step 1304, new values for class B attributes are placed in a SVAL, and one or more UPDATE statements are executed. An example of a suitable UPDATE statement is: UPDATE master-table set mapped-column=newBvalue where master-table.primary-key=pkvalue. In step 1306, at least two operations are performed. First, the key value for the new attribute value is obtained (e.g. obtain the key value for the employee's new Manager) using, for example, the SQL statement: SELECT master-linked-column from mapped-column-table where mapped-column=<cvalue>. Second, the master table is then updated using the key value obtained from the SELECT operation. For example, the following SQL statement can be used: UPDATE master-table set master-link-column=KeyValue_for_newCvalue where master-table.primary-key=pkvalue. In step 1308, the mapped-table is updated for class D attributes using, for example, the following SQL statements: UPDATE mapped-table set mapped-column=Dvalue where master-linked-column=pkvalue.

In step 1310, for each class E attribute, delete the old evalues and pkvalue from the mapped column table and insert new evalues and pkvalue in the mapped column table using, for example, the following SQL statements: (1) DELETE from mapped-column-table where mapped-column=deleted-evalue and master-linked-column=pkvalue; and (2) INSERT into mapped-column-table(mapped-column, master-linked-column) values (new-evalue, pkvalue). In step 1312, for each class F attribute, get the key values (old and new) for the updated attribute, delete the old key values and pkvalue from the master-linked-column table, and insert new key values and pkvalue to the master-linked-column table. In one embodiment, step 1312 is performed using the following SQL statements: (1) SELECT mapped-table-link-column from mapped-table where mapped-column in (deleted-f-values); (2) SELECT mapped-table-link-column from mapped-table where mapped-column in (added-f-values); (3) INSERT into master-linked-column-table (mapped-table-linked-column, master-table-linked-column) values (added-f-keyvalue, pkvalue); and (4) DELETE from master-linked-column-table where mapped-table-linked-column=deleted-f-keyvalue and master-linked-column=pkvalue.

In step 1314, for each class G attribute, update the master-link-column of master table to null for deleted gvalues and set the master-link-column to pkvalue for the added gvalues. In one embodiment, step 1314 is performed using the following SQL statements: (1) UPDATE master-table set master-link-column=null where master-table.primary-key in (deleted-g-values); and (2) UPDATE master-table set master-link-column=pkvalue where master-table.primary-key in (added-g-values). In step 1316, for each class H attribute, get key values for deleted values and added (e.g., new) values, update the master table to set the master-link-column to null for deleted values and set the master-link-column to pkvalue for the added values. In one embodiment, step 1316 is performed using the following SQL statements: (1) SELECT master-table.primary-key from master-table where mapped-column in (deleted-h-values); (2) SELECT master-table.primary-key from master-table where mapped-column in (added-h-values); (3) UPDATE master-table set master-link-column=null where master-table.primary-key in (deleted-h-keyvalues); and (4) UPDATE master-table set master-link-column=pkvalue where master-table.primary-key in (added-h-keyvalues). If any of the above steps fail, then rollback the transaction; otherwise, commit the transaction in step 1318.

IV. Partitioning

Figure 19:
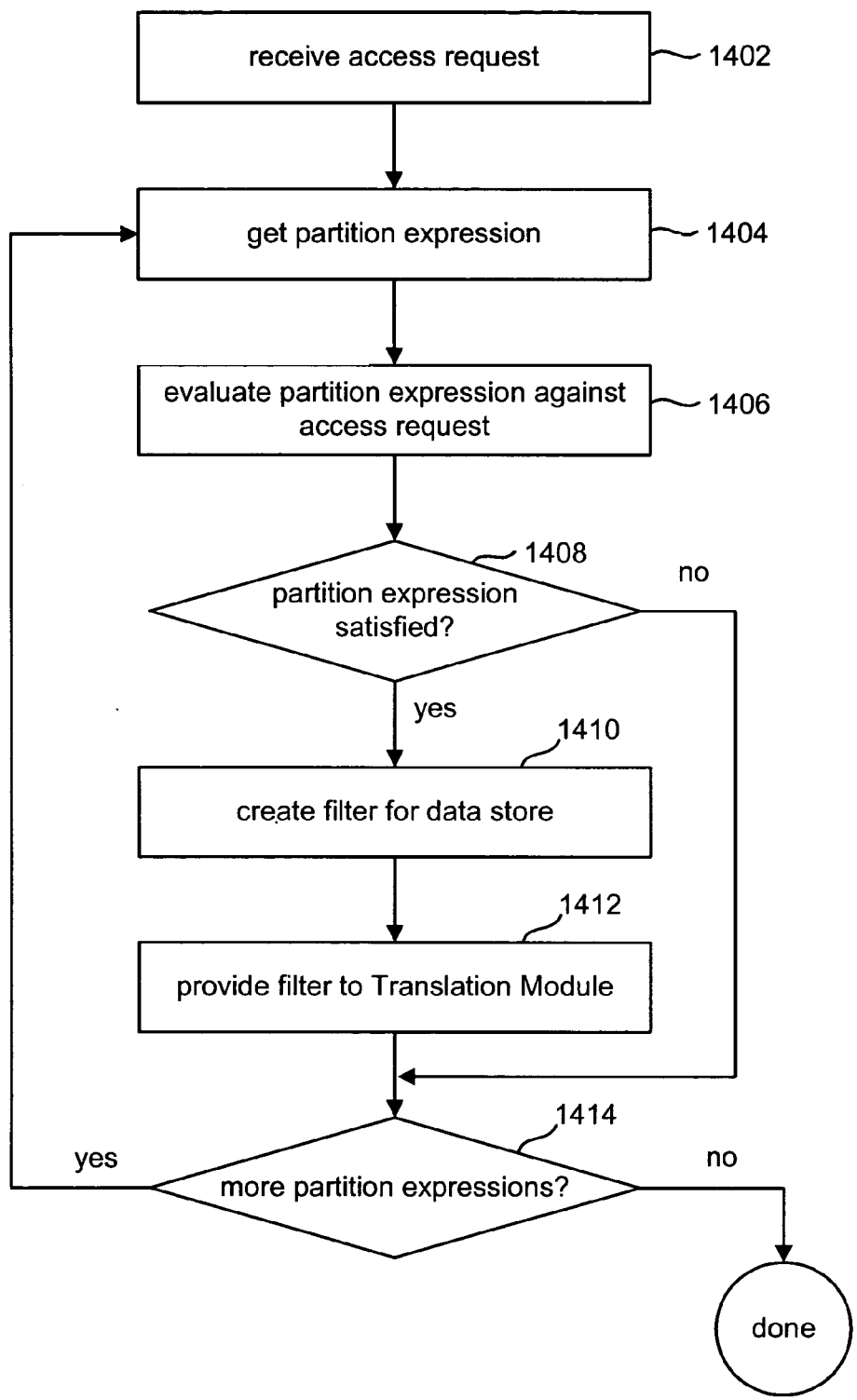
FIG. 19 is a flow chart describing one embodiment of a process for partitioning a data access request.

Step 602 of FIG. 6 includes determining which data stores can service a particular data access request and step 604 includes sending that data access request to the appropriate translation modules corresponding to the appropriate data stores. FIG. 19 provides a flowchart for performing steps 602 and 604 of FIG. 6. That is, the process described in FIG. 19 includes determining which data store a particular access request is for and providing the request (or a portion of that request) to the translation module for that data store. The process of FIG. 19 will first be described with respect to a search operation. Other operations will be described below. In one embodiment, any one profile will be stored within a single data store. That is, profiles are not split. In other embodiments, profiles can be split.

In step 1402 of FIG. 19, the access request is received. This corresponds to step 600 of FIG. 6. In step 1404, one of the system's partition expressions is accessed. A partitioning expression is defined, generally, as criteria for defining what data is in a particular data store. In one embodiment, the partitioning expression is in LDAP filter format, with the attribute names being in the logical object class namespace. The partition expression can be a simple filter expression or a composite expression, where the composite expression is made up of multiple simple expressions combined by one or more logical operators. For example, consider a system that has two data stores, where one data store is used to store information about employees in the United States and the other data store is used to store information about employees in Europe. The partition expression for the first data store may be (region=United States) and the partition expression for the second data store may be (region=Europe). In one embodiment, a partition expression is created for each data store. For example, an administrator can manually create the partition expression, software can be used to automatically create the partition expression statically in advance or dynamically during use of the data store, or other means can be used to create the partition expression.

In step 1406, that partition expression will be evaluated against the data access request. The partition expression is in LDAP filter format. The access request also includes an LDAP filter. The filters are compared. If the filters overlap (completely or partially), then the partition expression is satisfied (step 1408), and a partitioning module 422 will create a filter for the data store associated with the partition expression in step 1410. That created filter will be provided to the appropriate translation module in step 1412. In step 1414, it is determined whether there are any more partition expressions to evaluate. If so, the process loops back to step 1404, accesses the next partition expression and repeats steps 1406-1412. If there are no more partition expressions to evaluate, the process of FIG. 19 is finished. Note that in step 1408, if the partition expression is not satisfied (e.g., because there is no overlap between the partition and the filter expression in the data access request), the process skips from step 1408 directly to step 1414.

Note that if the partition expression is satisfied in step 1408, a filter is created for the particular data store and that filter is provided to the appropriate translation module. That filter will then be translated as described above. The reason that a new filter is created in step 1410 is that, in some cases, a portion of the filter in the access request may not be appropriate for the particular data store. For example, if one or more terms of the data access request are not mapped to the particular data store, then those terms need to be removed from the filter expression. Thus, the new filter created in step 1410 will include most of the original filter but will remove the attributes that are not mapped. In some embodiments, when all attributes are mapped to the data store, step 1410 will just pass on the original filter from the data access request.

For example, consider two data stores: data store 1 and data store 2. Data store 1 stores identity profiles that include the following three attributes: name, userID and password. Data store 2 stores identity profiles that include the following three attributes: name, salary and manager. The partition expression for data store 1 may be, for example, (name=s*), indicating that data store 1 always stores identity profiles of people whose name starts with a "s." The partitioning expression for data store 2 may be, for example, NOT (name=s*), indicating that identity profiles for those people whose names do not start with an "s" are stored in data store 2. The system may also include other data stores. Assume that an access request is received that includes a filter that indicates, for example, AND [OR (name=Sam) (name=Albert)][OR (userid=s*) or (salary>1000)]. In the above case, the filter overlaps with both partition expressions; therefore, steps 1410 and 1412 will be performed for both data store 1 and data store 2. However, when creating the filter for step 1410, the original filter will be truncated to only include those attributes mapped to the appropriate data store. For example, the output filter in step 1410 for data store 1 will be (AND(name=Sam)(userid=s*)). The filter from step 1410 for data store 2 will be (AND(name=Al)(salary>1000)).

FIG. 20 is a flowchart describing one embodiment of a process for evaluating a partition expression against a data access request (see step 1406 of FIG. 19). In step 1440, a filter expression tree is created from the filter expression of the data access request. For example, FIG. 10A provides an example of a filter expression tree. In step 1442, a partition expression tree is created from the partition expression. Step 1442 is carried out in a similar manner to step 1440. That is, a partition expression is similar to a filter expression in that both are in LDAP filter formats. Thus, both are used to create an expression trees in the same manner. FIG. 21 provides an example of a partition expression tree for the following partition expression: NOT (AND(country=US)(department=sales)). In step 1444, the mapped attributes of the filter and partition expressions are accessed. If these attributes have already been mapped in the Mapping Catalog, then the data from the Mapping Catalog can be accessed. In step 1446, a partition function is called. This partition function includes three parameters: the filter expression tree (FT), the partition expression tree (PT), and the mapped attributes (MA). Note that FIG. 20 is performed for one filter expression tree and one partition expression tree. For each partition expression, the process of FIG. 20 will be performed.

Figure 22:
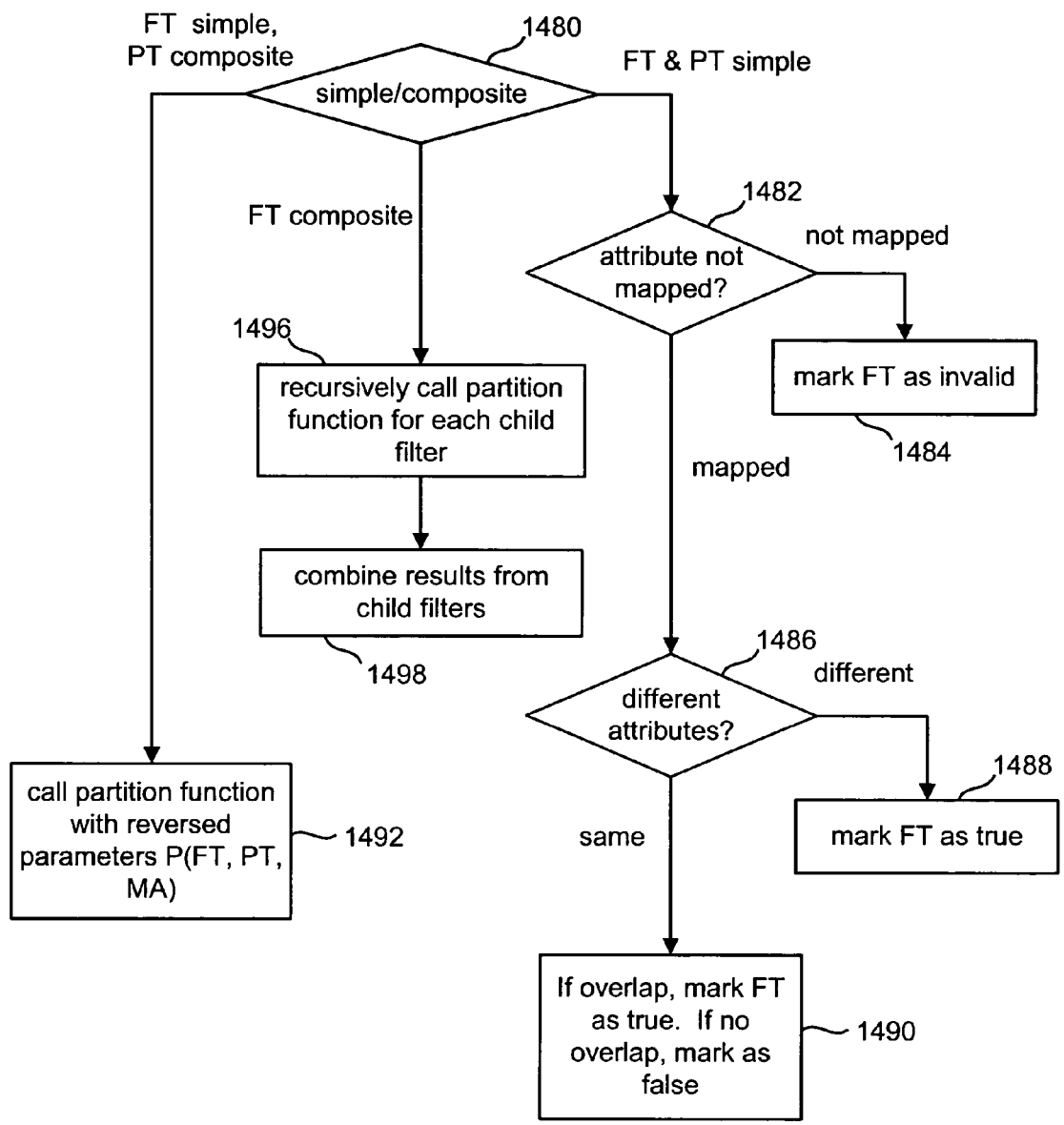
FIG. 22 is a flow chart describing one embodiment of a process for a partition function.

FIG. 22 is a flowchart describing one embodiment of a process for performing a partition function (see step 1446 of FIG. 20). In step 1480, it is determined what type of expressions the filter expression and partition expression are. If both the filter expression and the partitioning expression are simple expressions, then the process continues at step 1482. A simple expression is in the form (attribute<operator>value). In step 1482, it is determined whether the attribute of the filter expression is mapped to the data store corresponding to the partition expression. That is, the system determines whether the particular attribute in the filter expression resides in the mapping catalogue for the data store. If it is not mapped, then the filter expression is marked as being invalid in step 1484. If the attribute is mapped, then in step 1486 it is determined whether the attributes in the filter expression and the partition expression are the same. If they are different, the filter expression is marked as true because it is possible that the expressions overlap. If the attribute in the filter expression is the same as the attribute in the partition expression, then table 9 is used to determine whether there is an overlap condition. If there is an overlap condition, then the filter expression is marked as true. If there is no overlap, then the filter expression is marked as false. For example, if the partition expression says (SALARY>1000) and the filter expression says (SALARY=5000), then there is overlap and the filter expression is marked as true in step 1490.

TABLE 9

Do Simple expressions overlap?

| Partition expression | Filter expression | Overlap condition |
| --- | --- | --- |
| a = k1 | a = k2 | (k1 = k2) |
| a = k1 | A >= k2 | (k1 >= k2) |
| a = k1 | A <= k2 | (k1 <= k2) |
| a >= k1 | a = k2 | (k1 <= k2) |
| a >= k1 | A >= k2 | True |
| a >= k1 | A <= k2 | (k1 <= k2) |
| a <= k1 | a = k2 | (k1 >= k2) |
| a <= k1 | A >= k2 | (k1 >= k2) |
| a <= k1 | A <= k2 | True |

If, in step 1480, it is determined that the filter expression is simple and the partition expression is a composite expression (made up of multiple simple expressions joined together by one or more operators), then the partition function (the process in FIG. 22) is called with reverse parameters in step 1492. That is, the partition function is called as P(PF, FT, MA) rather than P(FT, PT, MA). When this is done, the partition function knows to transfer any markings of invalid, true and false, from the partition expression tree to the filter expression tree.

If, in step 1480, it is determined that the filter expression is a composite expression, then in step 1496, the system recursively recalls the partition function (the process of FIG. 22) for each child sub-filter of the current level of the filter. For example, if a filter is made up of the following sub-filters: (name=Sam) OR (name=Al), the first child sub-filter is (name=Sam) and the second child sub-filter is (name=Al). Step 1496 will include calling the partition function first for the child sub-filter (name=Sam) and then for the child sub-filter (name=Al). In step 1498, the results from recursively calling the partition function for the child sub-filters will be combined, as explained below.

Figure 23:
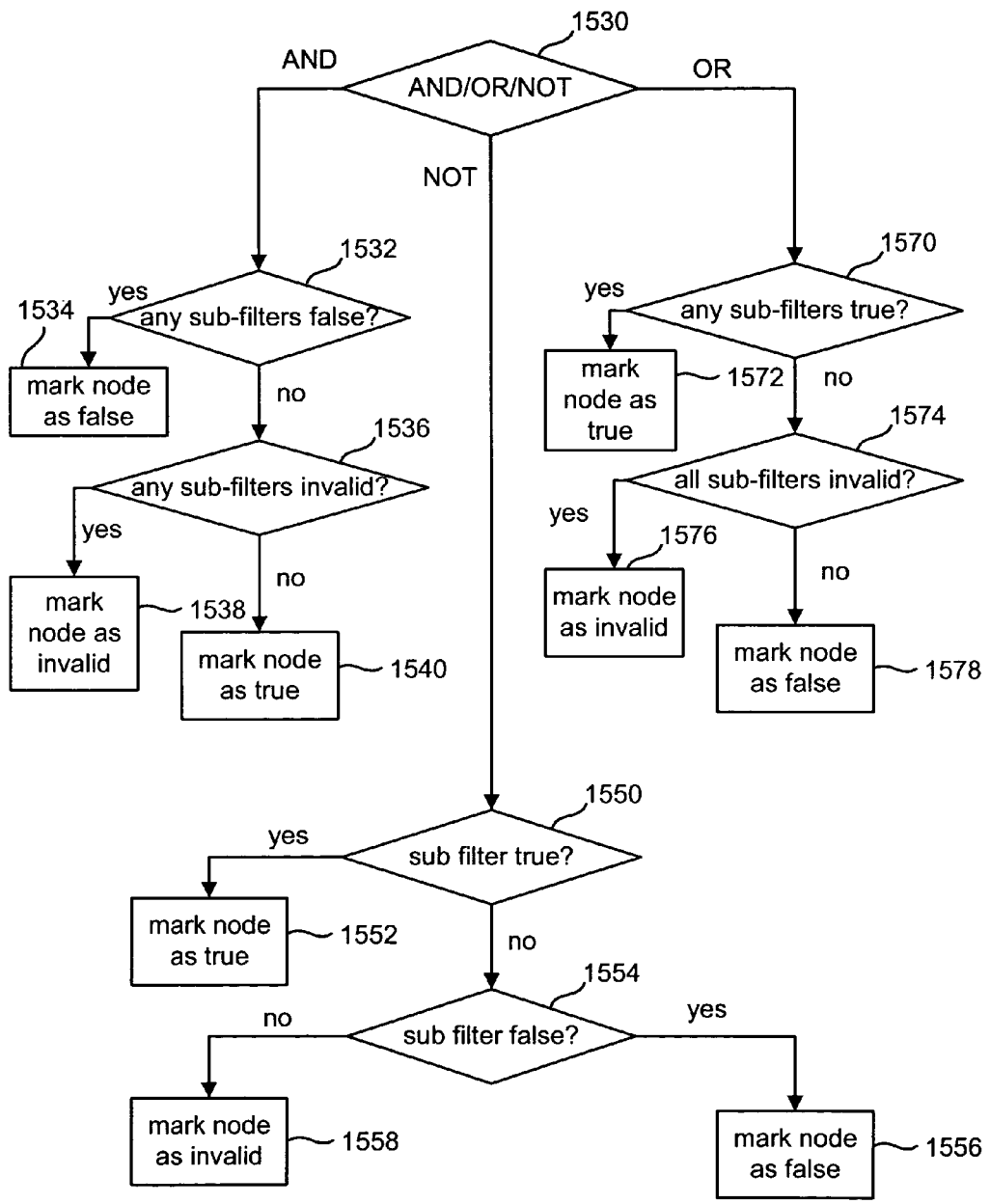
FIG. 23 is a flow chart describing one embodiment of a process for combining results for child sub-filters.

FIG. 23 is a flowchart describing one embodiment of a process for combining the results when calling the partition function for multiple child sub-filters (see step 1498 of FIG. 22). The input to the process of FIG. 23 will be the filter expression tree with each of the child nodes being marked true, false or invalid. In step 1530, it is determined whether the operator for the relationship among the child filters is "AND," "OR," or "NOT." If the operator is "AND," then the process continues at step 1532. In step 1532, if any of the child sub-filters are marked as false, then the node under consideration (the node that operates on the sub-filters) is marked as false. In step 1534, if none of the child sub-filters were marked as false, then it is determined whether any of the sub-filters were marked as invalid in step 1536. If any of the sub-filters were marked as invalid, the node under consideration is marked as invalid in step 1538. If none of the sub-filters were marked as invalid, then the node under consideration is marked as true in step 1540.

If, in step 1530, it is determined that the logical operator for the current node is "NOT," then the process continues at step 1550. In the case where the logical operator is "NOT," there is likely to be one child sub-filter. If that child sub-filter is marked as true (step 1550), then the node under consideration is also marked true in step 1552. Otherwise, it is determined whether the sub-filter is marked as false in step 1554. If the sub-filter is marked as false, then the node under consideration is marked true in step 1556. If the sub-filter is not marked as false, then the node is marked as invalid in step 1558.

If, in step 1530, it is determined that the operator for the current node is "OR," then the process continues as step 1570. If any of the sub-filters are marked true, then the node under consideration is also marked true in step 1572. Otherwise, if all of the sub-filters are invalid (step 1574), then the node is marked as invalid in step 1576. If all of the sub-filters are not marked invalid in step 1574, then the node is marked as false in step 1578. Note that when generating the filter expressions in step 1410, in one embodiment, only the "true" nodes will need to be translated to datasource specific namespace. Except in the case of filter nodes under a "NOT" node, all of the invalid nodes are not translated to datasource specific name spaces. Note that OR/AND nodes will not generate corresponding OR/AND operator datasource specific filters if it only has one child marked true, only the child node will generate the datasource specific filter.

The above process is primarily used for search operations. If the data access request is a DELETE or MODIFY operation, then it is likely to be commenced by first performing a SELECT statement (e.g., a search) followed by the various DELETES and/or UPDATES. In that case, the search operation (the SELECT) is subjected to the process of FIG. 19. When the UPDATES and/or DELETES are performed, they already know which data stores to use. In the event that the delete or modify operation does not require a search, the system can perform a select statement, thereby forcing the performance of the process of FIG. 19.

For an ADD operation, the partitioning module can be provided all of the attributes. The partitioning module can then compare the attributes of the ADD operation to the attributes of the various partition expressions, as explained above, and determine which data store the profile should be added to. That is, the attributes can be used to create a filter expression tree which can be created as part of step 1440 of FIG. 12 and compared to partition functions in order to determine which data store the data should be stored into.

Consider the following example with three data stores. The following table indicates the attributes mapped into each data store and the partition expression for each data store.

TABLE 10

Example

| Data Store | Mapped Attributes | Partition Expression |
|---|---|---|
| P1 | x1, x2, x3 | (x1 <= 2) |
| P2 | x1, x2, x4 | AND (x1 >= 3)(x1 <= 20) |
| P3 | x1, x2, x3, x4 | (x1 >= 21) |

The following is the filter expression for a data access request: Ft=(and(x1<=6)(x2=5)). For data store P1, the partition function is called as follows: partition (Ft, (x1<=2), MA=[x1, x2, x3]). The filter is a composite filter. Thus, step 1496 includes recursively recalling the partition function for sub-filter (x1<=6) and sub-filter (x2=5). For the first sub-filter (x1<=6), the attributes in the sub-filter expression and the partition expression are the same, so step 1490 is performed. The sub-filter is marked true based on Table 9 because there is partial overlap. For the second sub-filter, the attributes are different and, thus, the sub-filter is marked as true in step 1488. After recursively recalling the partition function twice, the results are combined in step 1498, which includes marking the entire filter as true in step 1540.

For data store P2, the partition function is called as follows: partition (Ft, PT, MA), where MA=[x1, x2, x4) and PT=AND(x1>=3) (x1<=20). Because Ft is a composite, step 1496 is performed. The partition function is recalled recursively for both child sub-filters in step 1496. When the partition function is called for the first child filter, step 1480 determines that the partition function was called for a simple filter expression (the child filter) and a composite partition expression. Thus, step 1492 is performed which includes calling a partitioning function again but switching the filter expression and the partition expression. For example, P([AND(x1>=3)(x1<=20)], (x1<=6), MA).

For the third data store P3, the partition expression is (x1>=21). The composite expression for the filter causes the process to perform step 1496 and recursively call the partition function for each of the child sub-filters. The first child sub-filter is compared against the partition expression to determine if there is overlap. It is determined that (x1<=6) and (x1>=21) do not overlap in step 1490; therefore, the node is marked as false. When the partition function is called for the second child sub-filter in step 1486, it is determined that the attributes of the second child sub-filter are different than the partition expression; therefore, the second sub-filter (x2=5) is marked as true in step 1488. When the composite is determined by combining the results for child sub-filters in step 1498, step 1534 marks the composite as false because one of the sub-filters is false. Therefore, the filter FT does not qualify for the partition expression and the filter will not be sent to the translation module for data store P3.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method for partitioning, comprising: receiving a data access request from an Identity and Access System, said data access request includes a filter, said filter includes one or more variables in a first format; determining one or more data stores of a plurality of data stores to service said data access request, said step of determining includes accessing one or more mappings of said one or more variables to said plurality of data stores~ and using said mappings to evaluate partition expressions for said data stores, wherein using said mappings to evaluate partition expressions for said data stores includes determining whether said filter overlaps with said partition expressions based on said mappings by performing a partition compare function using said filter and a first partition expression to determine whether said filter overlaps with said first partition expression if said filter and said first partition expression are both simple expressions and performing said partition compare function by treating said filter as an input partition expression and treating said first partition expression as an input filter in order to determine whether said filter overlaps said first partition expression if said first partition expression is a composite expression, and wherein said plurality of data stores comprises at least one relational database and at least one Lightweight Directory Access Protocol (LDAP) directory; and sending information for said data access request to said one or more data stores determined to service said data access request.

2. A method according to claim 1, wherein:
said data access request includes a search operation.

3. A method according to claim 1, wherein:
said data access request includes adding new data to a data store.

4. A method according to claim 1, wherein:
said data access request includes accessing data in both the relational database and the LDAP directory.

5. A method according to claim 1, wherein:
said data access request includes accessing data in only one data store.

6. A method according to claim 1, wherein:
said plurality of data stores includes at least two relational databases.

7. A method according to claim 1, wherein:
said step of sending includes translating said data access request to a format suitable for said relational database and communicating said translated data access request to said relational database.

8. A method according to claim 7, further comprising:
receiving a result from said relational database.

9. A method according to claim 7, further comprising:
receiving a result from said relational database; and translating said result to said logical object class format.

10. A method according to claim 1, wherein:
said access request is from an Identity System.

11. A method according to claim 1, wherein:
said plurality of data stores store identity information.

12. A method according to claim 1, wherein:
said partition expressions are in LDAP filter format.

13. A method according to claim 1, wherein:
said first format is a logical object class format that is compatible with LDAP filter format.

14. A method according to claim 1, wherein:
said step of sending includes creating a custom filter for said data access request that is customized for said relational database to only include one or more variables mapped to said relational database.

15. A method according to claim 1, wherein determining whether said filter overlaps with said partition expressions based on said mappings comprises:
determining whether child sub-filters of said filter overlap with said partition expressions and combining results of said determination of whether child sub-filters overlap to determine whether said filter overlaps with said partition expressions, if said filter is a composite expression.

16. One or more processor readable storage devices having processor readable code embodied on said processor readable storage devices, said processor readable code for programming one or more processors to perform a method comprising: receiving a data access request from an Identity and Access System, said data access request includes a filter, said filter includes one or more variables in a first format; determining one or more data stores of a plurality of data stores to service said data access request, said step of determining includes accessing one or more mappings of said one or more variables to said plurality of data stores~ and using said mappings to evaluate partition expressions for said data stores, wherein using said mappings to evaluate partition expressions for said data stores includes determining whether said filter overlaps with said partition expressions based on said mappings by performing a partition compare function using said filter and a first partition expression to determine whether said filter overlaps with said first partition expression if said filter and said first partition expression are both simple expressions and performing said partition compare function by treating said filter as an input partition expression and treating said first partition expression as an input filter in order to determine whether said filter overlaps said first partition expression if said first partition expression is a composite expression, and wherein said plurality of data stores comprises at least one relational database and at least one Lightweight Directory Access Protocol (LDAP) directory; and sending information for said data access request to said one or more data stores determined to service said data access request.

17. One or more processor readable storage devices according to claim 16, wherein:
said step of sending includes translating said data access request to a format suitable for said relational database based on said mappings and communicating said translated data access request to said relational database.

18. One or more processor readable storage devices according to claim 16, wherein:
said partition expressions are in LDAP filter format.

19. An apparatus that can partition, comprising: one or more storage devices; and one or more processors in communication with said one or more storage devices, said one or more processors perform a method comprising: accessing a data access request from an Identity and Access System, said data access request includes a filter, said filter includes one or more variables in logical object class format, determining one or more data stores of a plurality of data stores to service said data access request, said step of determining includes accessing one or more mappings of said one or more variables to said plurality of data stores~ and using said mappings to evaluate partition expressions for said data stores, wherein using said mappings to evaluate partition expressions for said data stores includes determining whether said filter overlaps with said partition expressions based on said mappings by performing a partition compare function using said filter and a first partition expression to determine whether said filter overlaps with said first partition expression if said filter and said first partition expression are both simple expressions and performing said partition compare function by treating said filter as an input partition expression and treating said first partition expression as an input filter in order to determine whether said filter overlaps said first partition expression if said first partition expression is a composite expression, and wherein said plurality of data stores comprises at least one relational database and at least one Lightweight Directory Access Protocol (LDAP) directory, and sending information for said data access request to said one or more data stores determined to service said data access request.

20. An apparatus according to claim 19, wherein:
said step of sending includes translating said data access request to a format suitable for said relational database and communicating said translated data access request to said relational database.

21. An apparatus that can partition a data access request, said data access request includes a filter, said filter includes one or more variables in a first format, comprising: means for determining one or more data stores of a plurality of data stores to service said data access request from an Identity and Access System, said step of determining includes accessing one or more mappings of said one or more variables to said plurality of data stores~ and using said mappings to evaluate partition expressions for said data stores, wherein using said mappings to evaluate partition expressions for said data stores includes determining whether said filter overlaps with said partition expressions based on said mappings by performing a partition compare function using said filter, and a first partition expression to determine whether said filter overlaps with said first partition expression if said filter and said first partition expression are both simple expressions and performing said partition compare function by treating said filter as an input partition expression and treating said first partition expression as an input filter in order to determine whether said filter overlaps said first partition expression if said first partition expression is a composite expression, and wherein said plurality of data stores comprises at least one relational database and at least one Lightweight Directory Access Protocol (LDAP) directory; and means for sending said data access request to said one or more data stores determined to service said data access request.

* * * * *

UNITED STATES PATENT AND TRADEMARK OFFICE
CERTIFICATE OF CORRECTION

PATENT NO. : 7,340,447 B2
APPLICATION NO. : 10/682330
DATED : March 4, 2008
INVENTOR(S) : Ghatare It is certified that error appears in the above-identified patent and that said Letters Patent is hereby corrected as shown below:

On page 3, in column 1, under "U.S. Patent Documents", line 21, delete "Kobayahi" and insert -- Kobayashi --, therefor.

On page 4, in column 1, under "Other Publications", line 1, delete "Reeingineering" and insert -- Reengineering --, therefor.

On page 4, in column 2, under "Other Publications", line 21, delete "Diistributed" and insert -- Distributed --, therefor.

On page 4, in column 2, under "Other Publications", line 22, delete "Coputer," and insert -- Computer, --, therefor.

On sheet 5 of 17, Figure 5, line 5, below "508" delete "508".

On sheet 10 of 17, Figure 14, Box No. 1006, line 4, delete "primary_key_colun_" and insert -- primary_key_column_ --, therefor.

In column 3, line 63, after "tree" insert -- . --.

In column 13, line 14, delete "schemes" and insert -- schemas --, therefor.

In column 13, line 21, delete "schemes" and insert -- schemas --, therefor.

In column 19, line 42, after "=" delete "'John')" and insert -- 'John') --, therefor.

In column 19, line 44, after "=" delete "'jsmith')" and insert -- 'jsmith') --, therefor.

In column 20, line 51, delete "primary_key_colun_" and insert -- primary_key_column_ --, therefor.

In column 21, line 4, delete "mapped column" and insert -- mapped_column --, therefor.

In column 22, line 43, after "(filter)" insert -- . --.

In column 23, line 62, delete "h" and insert -- H --, therefor.

In column 24, line 24, delete "attributre:" and insert -- attribute: --, therefor.

In column 24, line 36, delete "Where" and insert -- where --, therefor.

UNITED STATES PATENT AND TRADEMARK OFFICE
CERTIFICATE OF CORRECTION

PATENT NO. : 7,340,447 B2
APPLICATION NO. : 10/682330
DATED : March 4, 2008
INVENTOR(S) : Ghatare It is certified that error appears in the above-identified patent and that said Letters Patent is hereby corrected as shown below:

In column 25, line 26, after "= 'vikas'" insert -- . --.

In column 25, line 45, delete "masetr-" and insert -- master- --, therefor.

In column 29, line 42, delete "(country-US)" and insert -- (country=US) --, therefor.

In column 35, line 11, in claim 21, after "filter" delete ",".

Signed and Sealed this

First Day of December, 2009

David J. Kappos
*Director of the United States Patent and Trademark Office*